US006473791B1

(12) United States Patent
Al-Ghosein et al.

(10) Patent No.: US 6,473,791 B1
(45) Date of Patent: Oct. 29, 2002

(54) OBJECT LOAD BALANCING

(75) Inventors: Mohsen Al-Ghosein, Issaquah; Jan S. Gray, Redmond; Amit Mital, Kirkland; Rodney Limprecht, Woodinville, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/135,106

(22) Filed: Aug. 17, 1998

(51) Int. Cl.[7] ................................................. G06F 9/42
(52) U.S. Cl. ........................ 709/217; 709/100; 709/313; 709/315; 709/203; 709/224; 709/225
(58) Field of Search ........................ 709/100, 101–108, 709/310, 312, 315, 317, 320, 203, 223, 224, 217, 330

(56) References Cited

U.S. PATENT DOCUMENTS

| | | |
|---|---|---|
| 4,752,928 A | 6/1988 | Chapman et al. |
| 5,093,914 A | 3/1992 | Coplien et al. |
| 5,125,091 A | 6/1992 | Staas, Jr. et al. |
| 5,151,987 A | 9/1992 | Abraham et al. |
| 5,168,441 A | 12/1992 | Onarheim et al. |
| 5,179,702 A | 1/1993 | Spix et al. |
| 5,212,793 A | 5/1993 | Donica et al. |
| 5,315,703 A | 5/1994 | Matheny et al. |
| 5,442,791 A | 8/1995 | Wrabetz et al. |

(List continued on next page.)

FOREIGN PATENT DOCUMENTS

| | | |
|---|---|---|
| EP | 0559100 A2 | 2/1993 |
| EP | 0623876 A2 | 3/1994 |
| EP | 0638863 A1 | 10/1994 |
| EP | 0738966 A | 4/1996 |
| EP | 0777178 A | 11/1996 |

OTHER PUBLICATIONS

"An Object–Oriented Database System Jasmine: Implementation Application, and Extension", Hiroshi Ishikawa, et al., Apr. 1996.*

(List continued on next page.)

Primary Examiner—Majid Banankhah
(74) Attorney, Agent, or Firm—Klarquist Sparkman, LLP

(57) ABSTRACT

Intelligent Trust Management provides a centralized security facility that gives system components a flexible mechanism for implementing security policies. System components such as applications create a request describing an action that needs to be checked against an appropriate security policy. The request is given to a trust system that determines which policy object applies to the request, and may pass request arguments to the policy. The policy objects include executable code that uses any arguments along with dynamically obtained variable information to make a decision. The decision is returned to the system component, which then operates accordingly. Policy objects may maintain state and interface with the user independent of the system component in order to obtain information to make their decisions. Policy objects may call other policy objects and/or mathematically combine the results of other policy objects to make a decision.

40 Claims, 10 Drawing Sheets

U.S. PATENT DOCUMENTS

| | | |
|---|---|---|
| 5,459,837 A | 10/1995 | Caccavale |
| 5,485,617 A | 1/1996 | Stutz et al. |
| 5,524,238 A | 6/1996 | Miller et al. |
| 5,574,918 A | 11/1996 | Hurley et al. |
| 5,577,251 A | 11/1996 | Hamilton et al. |
| 5,579,520 A | 11/1996 | Bennett |
| 5,687,370 A | 11/1997 | Garst et al. |
| 5,689,708 A | 11/1997 | Regnier et al. |
| 5,752,038 A | 5/1998 | Blake et al. |
| 5,765,174 A | 6/1998 | Bishop et al. |
| 5,790,789 A | 8/1998 | Suarez |
| 5,802,291 A | 9/1998 | Balick et al. |
| 5,838,916 A | 11/1998 | Domenikos et al. |
| 5,881,225 A | 3/1999 | Worth |
| 5,884,316 A | 3/1999 | Bernstein et al. |
| 5,890,161 A | 3/1999 | Helland et al. |
| 5,907,675 A | 5/1999 | Aahlad |
| 5,941,947 A | 8/1999 | Brown et al. |
| 5,958,004 A | 9/1999 | Helland et al. |
| 5,958,010 A | 9/1999 | Agarwal et al. |
| 6,014,666 A | 1/2000 | Helland et al. |
| 6,026,428 A | 2/2000 | Hutchison et al. |
| 6,105,147 A | 8/2000 | Molloy |
| 6,134,594 A | 10/2000 | Helland et al. |

OTHER PUBLICATIONS

Orfali et al., The Essential Distributed Objects Survival Guide, pp. 423–452, 1996.

Brockschmidt, Inside Ole, pp. 277–338, 1995.

Nance, Balance the Load with Transaction Server, Byte Magazine, pp. 1–8, 1997.

Tomsen, "Virtually Crash Proof Your Web Site with IISS4.0," *Microsoft Interactive Developer*, vol. 2, No. 10, pp. 41–46, Oct., 1997.

Go, "Internet load–balancing solutions: Balance on the back end," *InfoWorld*, pp. 72–86, Mar., 1998.

Lam, "Building Scalable Apps," *PC Tech Magazine*, pp. 209–214, Apr., 1998.

"DCOM Technical Overview," Microsoft Press, pp. 1–32, Apr., 1998.

Horstmann & Kirtland, "DCOM Architecture," Microsoft Press, pp. 1–55, Apr., 1998.

U.S. application No. 09/071,594, Fox et al., filed May 1, 1998.

Jajodia, "Database Security and Privacy," (Tucker, editor) *The Computer Science and Engineering Handbook*, chapter 49, pp. 1112–1124 (Dec. 1996).

Sandhu, "Authentication, Access Control, and Instrusion Detection," (Tucker, editor) *The Computer Science and Engineering Handbook*, chapter 91, pp. 1929–1948 (Dec. 1996).

Moffett, J.D., Specification of Management Policies and Discretionary Access Control. In M. S. Sloman, editor, Network and Distributed Systems Management, chapter 17, pp. 455–479. Addison–Wesley, 1994.

Sloman, M. and Moffett, J.D., "Managing Distributed Systems", Domino Project Report, Imperial College, U.K. Sep. 1989.

Wiederhold, G.: Mediators in the Architecture of Future Information Systems. IEEE Computer, 25(3), 1992.

Sloman, M.S., Policy Driven Management for Distributed Systems. Journal of Network and Systems Management, 2(4): 333–360, Plenum Press Publishing, 1994.

Moffett, J.D. and Sloman, M.S., Policy Hierarchies for Distributed Systems Management. IEEE Journal on Selected Areas in Communications, Special Issue on Network Management, 11(9):1404–1414, Dec. 1993.

Gile, S., Reporting Application Usage in a LAN Environment, New Centerings in Computing Services, pp. 147–159 (1990).

Moffett, J.D. and Sloman M.S., (1991b), The Representation of Policies as System Objects, Proceedings of the Conference on Organisational Computer Systems (COCS'91) Atlanta, GA, Nov. 5–8, 1991, in SIGOIS Bulletin vol. 12, Nos. 2 & 3, pp 171–184.

Barkley, "Role Based Access Control (RBAC)," Software Diagnostics and Conformance Testing National Institute of Standards and Technology, pp. 1–27, Mar. 1998.

Cugini and Ferraiolo, "Role Based Access Control Slide Set–May 1995," National Institute of Standards and Technology, pp. 1–25, May 1995.

Ferraiolo and Barkley, "Specifying and Managing Role–Based Access Control Within a Corporate Intranet," National Institute of Standards and Technology, pp. 1–6, 1997.

Ferraiolo and Kuhn, "Role–Based Access Control," Reprinted from *Proceedings of 15th National Computer Security Conference*, pp. 1–11, 1992.

Orfali, Harkey, Edwards, "Client/Server Transaction Processing," *Essential Client/Server Survival Guide*, pp. 241–288, 1994.

Limprecht, "Microsoft Transaction Server," *Compcon '97. Proceedings, IEEE*, pp. 14–18, 1997.

Chappell, "The Microsoft Transaction Server (MTS)–Transactions Meet Components," http://www.microsoft.com/Com/wpaper/mtscomp.asp, Feb. 1998.

Orfali et al., "CORBA Services: System Management and Security," *The Essential Distributed Objects Survival Guide*, pp. 183–202, 1996.

"The Common Object Request Broker: Architecture and Specification," Revision 2.0, pp. 2–1 through 2–17, Jul. 1995.

U.S. application No. 08/959,139, Helland et al., filed Oct. 28, 1997.

U.S. application No. 08/959,149, Limprecht et al., filed Oct. 28, 1997.

"The Common Object Request Broker: Architecture and Specification," Revision 2.0, pp. 4–12 through 4–16, Jul. 1995.

Landwehr, "Protection (Security) Models and Policy," *The Computer Science and Engineering Handbook*, (Tucker, Ed.), CRC Press, pp. 1914–1928, 1997.

Bowen, "Intel's Middleware Move," *InfoWorld*, vol. 20, No. 9, pp. 1–2, Mar. 2, 1998.

Bochenski, *IBM's System View*, 1st Edition, Computer Technology Research Corporation, pp. 1–143, 1991.

Schiemann et al., "A New Approach for Load Balancing in High–Performance Decision Support Systems," Future Generation Computer Systems, vol. 12, No. 5, pp. 345–355, Apr. 1, 1997.

* cited by examiner

OBJECT LOAD BALANCING

FIELD OF THE INVENTION

The invention relates generally to computer systems, and more particularly to improvements in trust management for computer systems.

BACKGROUND OF THE INVENTION

Trust management is directed to the concept of controlling decisions made by system components such as applications with respect to certain potentially dangerous actions. In general, to make an appropriate decision, an application's desired action is verified against a policy. A policy for a particular action is a set of rules that determine whether that particular action is allowed or denied. By way of example, a web browser may make a decision on whether to download executable code from the Internet based on a policy comprising explicit user preferences and the validity of a digital signature on the code. Similarly, a certificate authority makes a decision whether to issue a certificate based on whether the requester complies with its policy for establishing its identity, while a secure operating system such as Microsoft Windows NT decides whether to log on a user based on a policy of whether the correct account password was supplied, the account is not locked out and whether other constraints, such as logon time and date restrictions, are not violated.

However, although in general the operation of verifying a request for action against a policy is common to trust management in applications, policy evaluation implementations are different in each application. For example, policies are represented in different ways in each application, and sometimes difficult for users to locate or recognize. Moreover, because the policies are built into the applications, the policies are essentially static and only minimally modifiable as limited by a few optional settings. As a result, there is no easy way to modify or add new policy constraints to policies used by applications to control their decisions, nor is there an easy way to enforce new domain-wide policies. Administrators of large (enterprise) networks are often forced to go to great lengths to uniformly implement policies.

SUMMARY OF THE INVENTION

Briefly, the present invention provides a system and method of using a policy to make a decision on a proposed action of a system component such as an application. In accordance with the present invention, policies are centrally maintained system resources available to any system component through an intelligent trust manager. Action information including the proposed action is received from a system component, and the action information is used to obtain a policy corresponding to the proposed action. To this end, the policy may be implemented in a COM object mapped by a policy manager to the action identified in the action information. The policy dynamically obtains variable information at the policy from a source independent of the system component, such as via state maintained in the policy, from other context, through a user interface, or from an external source such as a website. The policy makes a decision via executable code therein, based on the variable information obtained thereby, and returns the decision to the system component.

Other advantages will become apparent from the following detailed description when taken in conjunction with the drawings, in which:

DETAILED DESCRIPTION

Exemplary Operating Environment

Figure 1:
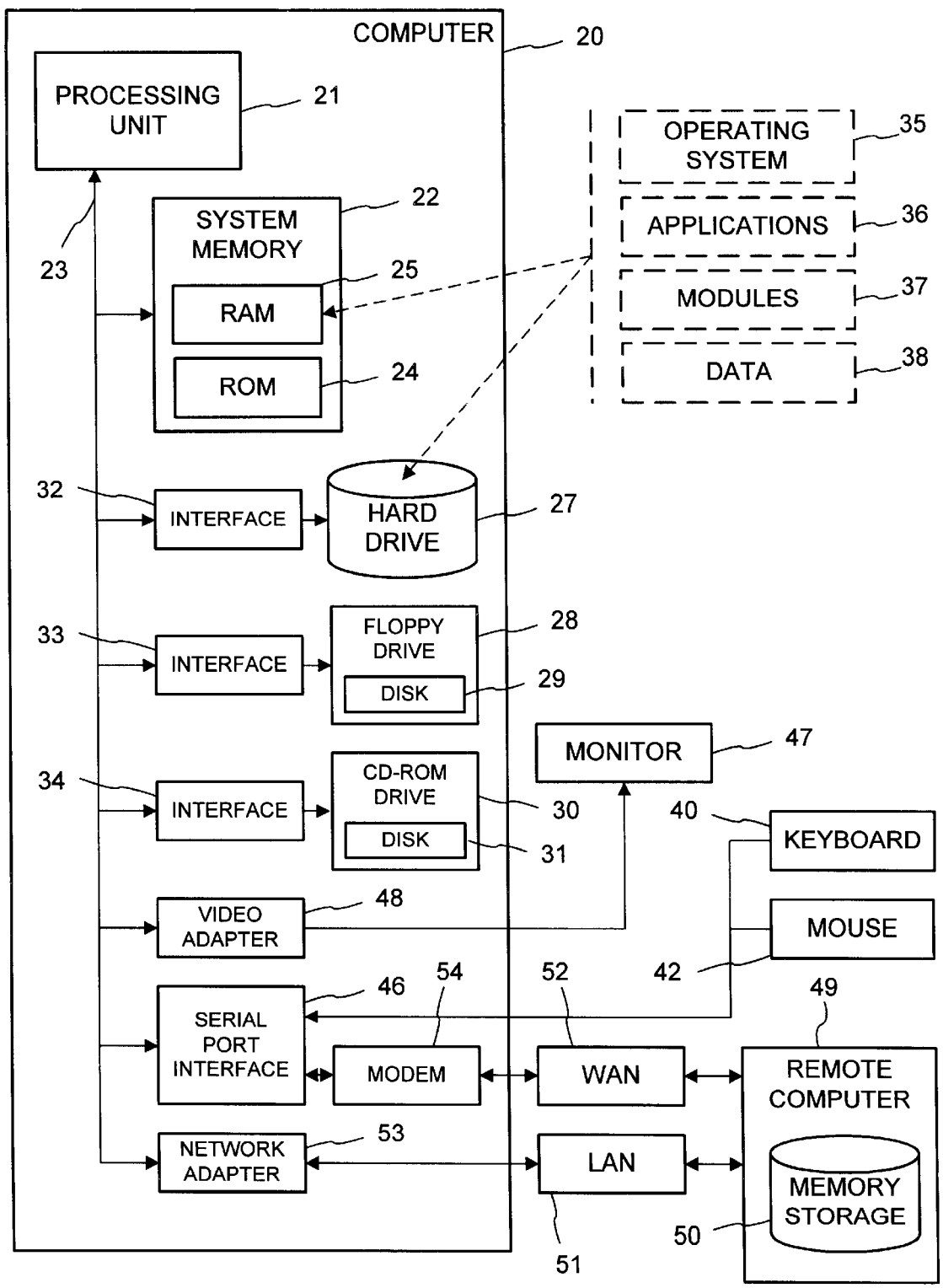
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The preferred implementation of the present invention is described herein with reference to the Component Object Model (COM). COM is a well-documented technology in which clients access services provided by COM objects by accessing methods therein through interfaces of the COM objects. COM provides for extensibility and future compatibility, and moreover, because policies (described below) are COM objects, they may be written in well-known and easy-to-use scripting languages such as VBScript and Jscript, or more powerful languages such as C++. For purposes of simplicity, a detailed discussion of COM is not included herein; a detailed description of COM objects is provided in the reference entitled "Inside OLE," second edition, Kraig Brockschmidt, Microsoft Press (1993), hereby incorporated by reference. Note that although COM is preferably used to implement the present invention, there is no intention to limit the present invention to a COM implementation. For example, as will be readily appreciated, the present invention may alternatively be implemented via application programming interface calls to functions or other equivalent implementations.

Intelligent Trust Management

Figure 2:
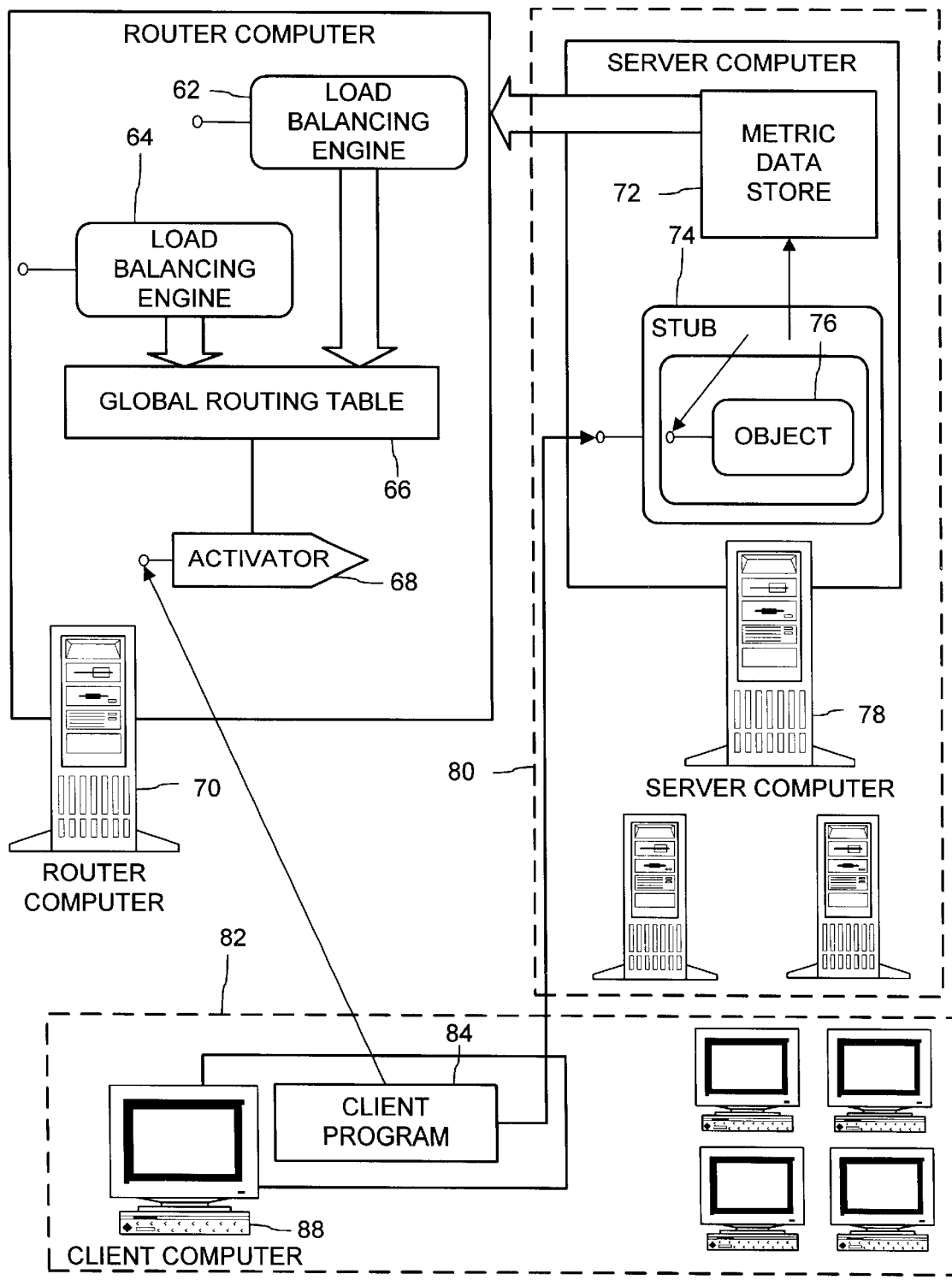
FIG. 2 is a block diagram generally representing the conceptual model of the present invention.

FIG. 2 shows the general conceptual model of the present invention wherein system components $60_1$–$60_n$ (e.g., applications) make calls to an intelligent trust manager 62 in order to have trust decisions made therefor in accordance with a predetermined policy. To obtain a decision, the intelligent trust manager 62 in turn communicates with a policy manager 64 to invoke an appropriate one of the policy objects $66_1$–$66_n$. The corresponding policy object (e.g. $66_3$) makes an advisory decision, i.e., yes, no or insufficient information to make a determination, and returns the decision to the system component (e.g., $60_1$) via the intelligent trust manager 62. Note that a request may correspond to more than one policy object, but for purposes of simplicity herein, a request will generally only be passed to one policy object. Note however, (as described in more detail below), the corresponding policy object may itself call on one or more other policy objects and use their decisions to make its final decision.

As represented in FIG. 2 and in accordance with one aspect of the present invention, policies are centrally maintained system resources available in a consistent manner to any system component of the system, yet policies are removed and isolated from the system components, and transparent thereto. To add a policy, the policy is appropriately registered like any other COM object, however for security purposes, the registration operation itself is typically subject to a policy, as described below. To replace a policy with another policy, the other policy is registered and the name binding (described below) changed so those system components using the name invoke the other policy instead of the existing policy. Among other benefits, the present invention thus allows policies to be shared by numerous system components, while essentially shielding the system components from the details of policy administration. Since policy objects are COM objects, they include executable code for making decisions, and moreover, may maintain state, generate their own user interface, and include one or more inference engines (deductive processes) to make decisions. In addition, they may be named, whereby administrators may intuitively locate and reference the appropriate policy object as needed, and may be digitally signed, which enables verifying the integrity of the policy object for security purposes, such as when registering and/or invoking the object. Note that although the various components are shown as directly connected in FIG. 2, it may be readily appreciated that the components and/or divisible portions thereof may be distributed throughout various systems of a network. Indeed, as will be described below, in enterprise networks, policies are often maintained throughout a domain, wherein client applications communicate with a domain server to access policies and receive decisions.

Figure 3:
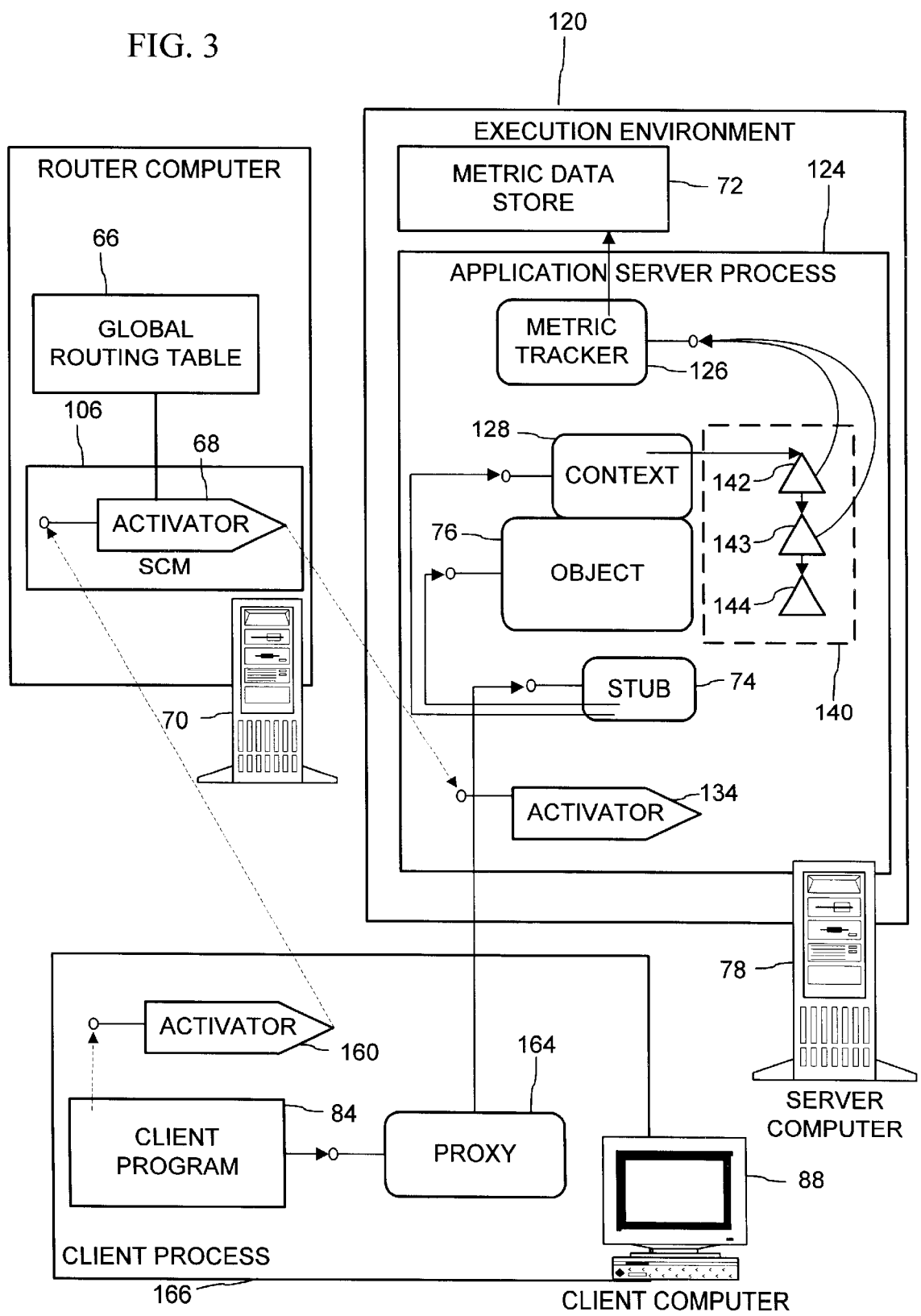
FIG. 3 is a block diagram generally representing the various components for implementing the trust management system of the present invention.
Figure 4:
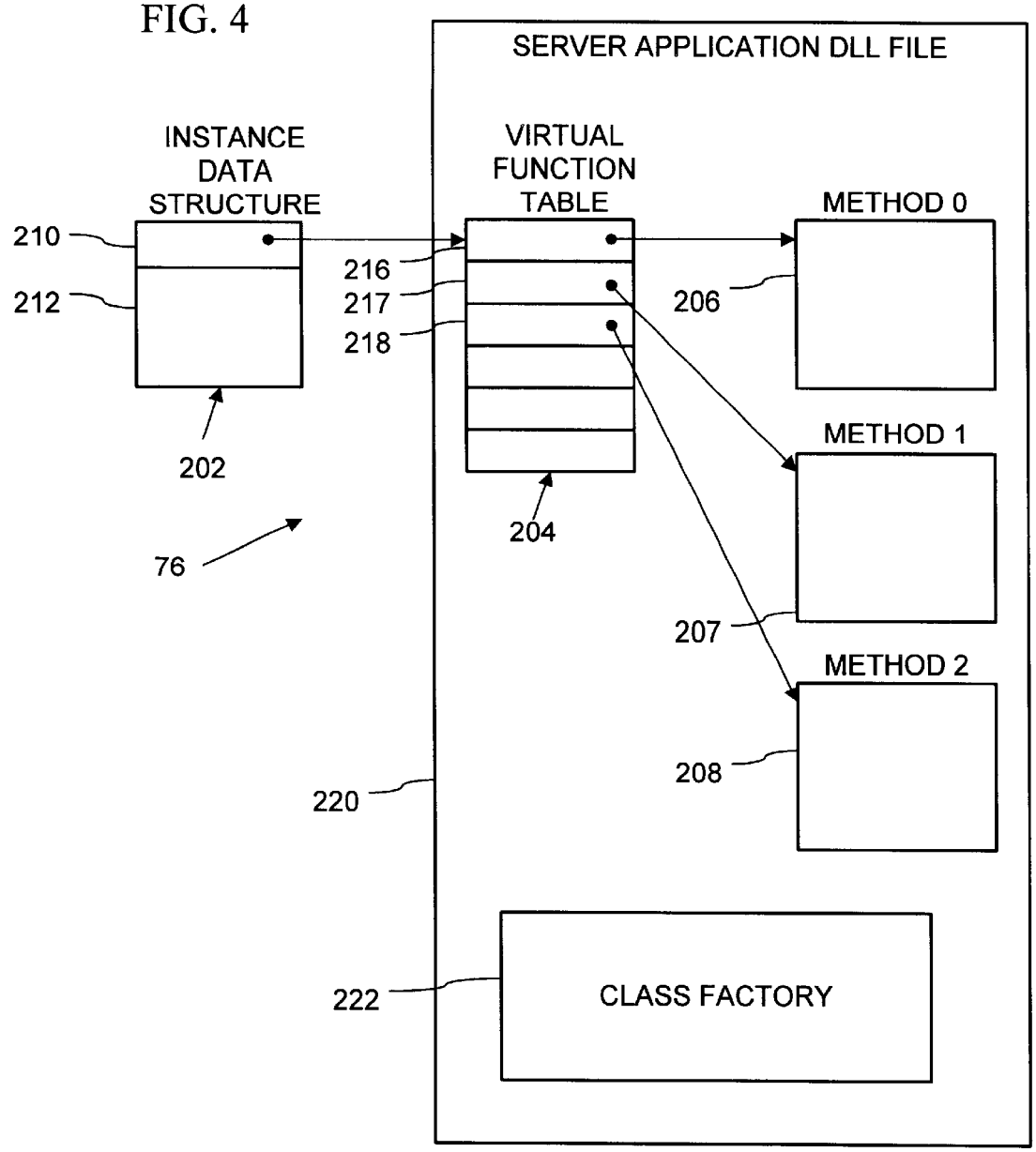
FIG. 4 is a timing chart representing the steps taken by the various components of the trust management system to produce a policy decision.

As shown in more detail in FIG. 3, and as represented in the timing chart of FIG. 4, the application (e.g., system component $60_1$) initiates the decision making process when the application $60_1$ needs to determine whether a potentially dangerous action that it is proposing to take is allowed or forbidden in accordance with a policy. By way of example, a browser application (e.g., $60_1$) that has been instructed by a user to download content from a website first will find out whether the action is allowable before following the instruction. To obtain a decision, the application $60_1$ bundles action information including a name or the like identifying the desired action and policy-specific arguments into a request 68 (e.g., a COM request object), and invokes a method of the intelligent trust manager 62 requesting a decision. Alternatively, one or more of the arguments may be maintained in an alternate location in the system, wherein the location is previously known to the policy, or the location is identified by the application $60_1$. In addition, the application $60_1$ may pass optional evidence to the intelligent trust manager 62, such as a security identifier that may be required to access certain files with certain rights. Note that in the implementation described herein, the application $60_1$ needs to know which policy it is invoking, as well as the arguments expected by the policy. Alternatively, however, the application $60_1$ may query the intelligent trust manager 62 to ascertain the available policies and/or any requirements thereof.

When the intelligent trust manager 62 receives the request 68, the intelligent trust manager 62 extracts the action identifier from the passed information therein. The intelligent trust manager 62 provides the ITM policy manager 64 with the policy name, whereby the corresponding policy object (e.g., $66_3$) is instantiated. Note that the ITM policy manager 64 includes or otherwise has access to a registry 70 (e.g., database, library, table or the like) that maps each action identifier to the appropriate policy object. More particularly, trust policy is a COM object implementing the ITrustPolicy interface. When the policy is queried for its decision about particular request for action, it receives a pointer to another COM object implementing ITrustable interface on input, and returns Trusted, Completely Trusted or Untrusted as output. The ITrustable interface is used encapsulate the application-specific request for action.

By way of example, consider the browser described above wherein a decision is needed on whether to download content from a site. In the request 68, the application $60_1$ identifies an action called "Fetch-URL" and also passes the URL (Uniform Resource Locator) of the site (e.g., www.site1.com) as an argument to the intelligent trust manager 62. The intelligent trust manager 62 takes the action identifier "Fetch-URL" and via the ITM policy manager 64, looks up and instantiates the corresponding policy object $66_3$, i.e., "URL.dll" in the present example.

Once the corresponding policy object $66_3$ is instantiated, the intelligent trust manager 62 forwards the appropriate arguments 72 (including any optional evidence) thereto, along with any context 74 that may be available for passing to the policy object. For example, the intelligent trust manager 62 may pass information about the state of the machine, stack information, information about the application $60_1$ and so on to the policy object $66_3$, such as when the intelligent trust manager 62 knows or otherwise believes that such information would be useful to the policy object $66_3$ in making its decision.

At this time, the policy object $66_3$ executes its internal code to make a decision. If the answer may be immediately decided as "Yes" or "No" based on the available information, the policy object $66_3$ returns its decision 76 to the application $60_1$ via the intelligent trust manager 62 (although it is alternatively feasible for the policy object to directly return the decision and any accompanying information to the application). Along with the decision 76, the policy object $66_3$ may return information such as its rationale for making the decision. Similarly, if desired, the intelligent trust manager 62 may supplement the return information and provide an (optionally) supplemented decision 78. In this manner, system components (e.g., applications) may modify their request as desired. For example, if a decision to access a file for read and write access is "No" because as reported back, a security identifier is needed, the requesting system component may choose to retry the request a second time with the security identifier bundled with the request.

Moreover, the policy object (e.g., $66_3$) may respond that it is unable to make a determination based on the information currently available thereto, (i.e., "I don't know"). Along with such a response, the policy object may return a list or the like specifying the information that it needs to make a "Yes" or "No" decision. For example, a decision on whether to download a file may depend on what version of an application is being used. If the version information cannot, for example, be independently determined by the policy object, the policy object may respond that it is unable to make a determination, and identify the lack of the version information as the reason. The application may then supply the information in a subsequent request if it is able to do so.

In accordance with one aspect of the invention, the policy object is capable of making dynamic determinations based on additional variable information it obtains (i.e., receives or otherwise knows of) independent of the system component (e.g., application). For example, the context 74 passed by the intelligent trust manager 62 may be independent of the system component requesting the decision and make an otherwise "Yes" answer a "No" answer, and vice-versa. Moreover, the policy object may communicate with the user via its own user interface 80 completely independent of the system component.

By way of example, assume that the URL.dll policy $66_3$ is written so as to return a "No" decision for any website content exceeding a ratings guideline, unless a parental override password is provided. For purposes of this example, it may be assumed that the browser application $60_1$ is not aware of ratings, and is limited to either downloading the site's content or not doing so in accordance with the policy determination. Indeed, while contemporary browsers contain such ratings policies, as will be described herein, the present invention obviates the need for incorporating the policy into the browser application, whereby future browsers may very well not have any ratings policy.

When a request is made for a decision on www.site1.com, the policy object $66_3$ includes code for communicating with the site in order to determine the rating of the content that has been requested. Based on the rating, the policy object $66_3$ may immediately make its decision, i.e., if below a certain ratings threshold, respond "Yes." However, rather than respond "No" to content above a certain ratings threshold, the policy object itself may be written to communicate through the user interface 80 to attempt to obtain a parental override password. Significantly, the policy object $66_3$ is able to dynamically adjust as information comes in, and may obtain additional information as needed independent of the application $60_1$.

In accordance with another aspect of the present invention, the policy objects are able to maintain variable state information 82, both while instantiated and, if needed, persistently by writing state data to a file or the like. The state information 82 may be used to make decisions dynamically and independent of the system component. For example, consider a policy that has been set up such that company managers may purchase items for the company from certain approved Internet sites so long as the managers' purchases as a whole do not total over ten-thousand dollars per month. In addition to verifying the site, the appropriate policy object may make a dynamic decision by temporarily adding the requested purchase price to an accumulated monthly total maintained as state information 82 in the policy object to decide whether to allow the requested purchase. Indeed, even more dynamically, the policy object may obtain the price from the site and multiply by a requested quantity to determine a requested purchase amount. In either event, if below the monthly limit, a "Yes" decision is returned and the total is increased. If "No," a smaller purchase next time may instead be approved. Thus, the policy object dynamically decides based on a submitted amount (or possibly an item and quantity) against an accumulated variable total. As can be appreciated, the system component (e.g., application) that submits the purchase form need not know anything about the total, and only has to pass in the site URL and the requested amount (or quantity and item information). Note that this makes changing the policy such as by increasing the limit relatively simple, yet secure, as the limit need only be changed in one secure, centralized location rather than on every managers' separate copy of an application.

In accordance with another aspect of the invention, policies may be combined mathematically and/or built up in a hierarchical manner to make a decision. To this end, a policy can call other policies (which in turn can call still other policies) and use their decisions to make a final decision. For example, as shown in FIGS. 5A–5D, policy may decide "Yes" only if two other policies below it both decide "Yes" (FIG. 5A, Boolean AND), if one of two policies decide "Yes" (FIG. 5B, Boolean OR) and so on. A policy may also implement a voting scheme, for example, to decide "Yes" to an action if m out of n (e.g., three out of five) policies it calls decide "Yes" (FIG. 5C).

In addition, a policy may be flexibly written to accept arguments that inform that policy how to make its determination. For example, a Boolean policy may exist that takes as arguments the names of two or more other policies along with a logical operator (e.g., AND, OR, XOR), and returns a result based on the results of the other policies as combined by the logical operator. Similarly, a "voting" policy may exist that takes as input the total number of "Yes" votes needed from other policies to return a "Yes" vote, (wherein the names of the other polices may be passed as arguments or already known to the voting policy object). Result information may also be passed to a policy, e.g., for one system component, three or less "Yes" votes return a yes, but four or more return a "No", while for another system component, one or more "Yes" votes are needed for a "Yes" result.

In an alternative implementation, policy objects may return a result using a particular Boolean algebra scheme based on a "Trusted, Completely Trusted and Untrusted" model. In general, "Trusted" corresponds to "Yes," "Untrusted" to "No," while Completely Trusted" corresponds to "Yes, and do not process further." The "Completely Trusted" result is useful in situations wherein subpolicies vote to make a decision, and certain ("Completely Trusted") subpolicies are given more weight than others. As can be readily appreciated, other schemes (e.g., subpolicies can return multiple votes based on their weight) may also be implemented.

Moreover, since policies can call other policies, a policy may make its decision by selecting other policies based on virtually any variable criteria, such as the number of logged in users or the time of day. The following pseudocode along with FIG. 5D demonstrates this concept, wherein according to a general URL policy, one of two particular URL policies (URL-working-hours or URL after-hours) are in effect depending on the time of day:

| URL Policy: |
|---|
| ⋮ |
| Time ( ); |
|     If Time > 8 am and < 5 pm |
|         ITM (URL-working-hours) |
|     Else |
|         ITM (URL-after-hours) |
| ⋮ |

The system component requesting the URL policy decision need know nothing about which policy is actually in effect, as it only requests a decision on an action from the URL policy, which unknown to the system component, calls on one of the other two policies to make the decision. While of course such a simplified example may be implemented in a single policy, the advantages and flexibility provided by the ability to combine policies into more and more complex policies can be readily appreciated. For example, the "working-hours" policy of the above example may be highly complex and regularly modified while the "after-hours" policy may be simple, never changed and thus left intact.

Although not necessary to the present invention, to facilitate the administration of policies, a management tool (ITM Administrator) 84 is provided (FIG. 2). The management tool 84 makes it possible for administrators to view and centrally adjust policies affecting operation of the operating system and system components and applications at one time, using a system-provided configuration editor 86 (FIG. 6). As can be readily appreciated, this single, centralized tool is a significant advantage over multiple, widespread application-specific utilities. The management tool 84 communicates with the ITM policy manager 64 to display the editor interface 86 (FIG. 5) for viewing and adjusting the policies. Note that since policies are COM objects, they may be organized under folders in a logical, hierarchical grouping. Thus, as shown in FIG. 6, administrators may quickly locate a policy such as the "Active Content Policy" under the "Intranet" folder.

Moreover, as represented in FIG. 3, each policy object preferably includes its own administrator user interface 88. The administrator user interface 88 is opened when the administrator mouse clicks or otherwise appropriately selects a named policy. This provides for simple patches, updates and the like. For example, as described above, the purchase limit maintained as state within a policy object may be adjusted by the administrator via the administrator user interface. Note that with the present invention, system components are not directly bound to any particular dynamic link library (dll), and thus policies may be changed without needing to modify the system components (e.g., applications) or their settings.

It should be noted that a policy object itself governs the other policy objects that are used and how they are used. For example, a policy object may be present that decides not to allow any other policy object to be added or changed unless an administrator that has been authenticated makes the change and a digital signature of the policy object is first verified. In other words, a governing policy requires verification of a digital signature before a policy may be registered. Similarly, a policy may ensure that no policy may be invoked without first verifying a digital signature on that policy.

Note that policy objects may be written in advance (e.g., by third parties) and grouped into packages 90 (FIG. 2) or the like that are appropriate for a given system. Thus, a user only need install a policy package that is appropriate, and modify policies as needed from there. For example, policy objects for home users and small networks are likely to be quite different than policies of enterprise networks. Indeed, within an enterprise network, an administrator often needs to control many hundreds of machines, users and system components, which may be considerably difficult if a system component such as an application does not have explicit support for such administration.

The present invention enables the establishment and enforcement of policies that apply to the entire enterprise network. For example, an enterprise policy may be to disable the download of any unsigned executables from outside of the enterprise Intranet, ask a user before downloading signed code, but install any code that is from the Intranet without user intervention. To be effective, this policy needs to apply domain-wide, i.e., every user must be affected. To facilitate domain-wide administration, the Intelligent Trust Management System of the present invention enables administrators to designate some policies as "domain-wide, whereby the policy is automatically replicated to every machine participating in the domain, whereby these policies affect every single user.

Lastly, it should be noted that while the above-described model is advisory in that it is up to the system component (e.g., application) to comply with the policy decision, it is feasible to have an enforcement model wherein policy decisions prevent applications from taking denied actions. For example, applications may be run in security contexts set up by a policy, whereby that policy and other called policies would determine the applications' access to system resources.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

We claim:

1. A computer-implemented method for providing an architecture accommodating load balanced instantiation of software objects within a server group of a plurality of server computers, the architecture being transparent to the objects, the method comprising the steps:

interposing a wrapper between a first load balanced object instantiated at a host server computer of the server group and a client of the first load balanced object, the wrapper intercepting calls to the first load balanced object to generate a performance measurement at the host server computer transparently to the first load balanced object;

at a router computer, monitoring performance at the server computers in the server group by collecting the performance measurement from the host server computer and at least one other performance measurement from other server computers in the server group to ascertain measured performance at the servers; and when measured performance of the host server is preferred over measured performance of other server computers in the server group, instantiating a second load balanced object on the host server computer as a result of the performance measurement.

2. A computer-readable medium having computer-executable instructions for performing the steps of claim 1.

3. The method of claim 1 wherein
   the first object is of an object class;
   the performance measurement is identified by object class as a measurement of performance for objects having the object class of the first object;
   the monitoring step determines performance at server computers in the server group for objects having the object class of the first object; and
   the instantiating step instantiates the second object at the host server computer based on whether the second object has an object class matching the object class of the first object.

4. The method of claim 1 wherein a plurality of objects of a same specified object class are instantiated on a selected target group associated with the object class, the target group being a subset of the server group of server computers.

5. The method of claim 1 wherein a selected replaceable load balancing engine designated for an object class determines when monitored performance of the host server computer is preferred over monitored performance of other server computers in the server group.

6. The method of claim 1 wherein the monitoring step comprises periodically blending the performance measurement with plural other similar performance measurements from the host server computer to generate a performance value indicative of performance at the host server computer, the blending sufficiently delayed by a time interval to dampen variance in the performance value.

7. The method of claim 6 wherein the time interval is selected by a system administrator.

8. The method of claim 1 wherein the performance measurement is generated transparently to the first object by a server-side policy of the first object, wherein the policy is invoked by the wrapper.

9. The method of claim 8 wherein
   the server-side policy is shared by a third object at the server computer; and
   the server-side policy generates an additional performance measurement associated with the third object, wherein the additional performance measurement is collected by the router computer to monitor host server computer performance.

10. The method of claim 8 wherein the performance measurement indicates method response time at the host server computer as generated by the server-side policy of the first object, the policy operative to observe a first time as a result of an enter event sent to the policy before a method call to the object, the policy further operative to observe a second time as a result of a leave event sent to the policy after the method call to the object, the policy further operative to generate the performance measurement by subtracting the first time from the second time.

11. The method of claim 8 wherein the performance measurement indicates database load as observed at the host server computer transparently to the first object by code invoked by the wrapper.

12. The method of claim 8 wherein the performance measurement indicates database access latency as observed at the host server computer transparently to the first object by code invoked by the wrapper.

13. In a computer network, a load balancing service for distributing object related resource requests among a plurality of load bearing targets identified by target identifiers, the load balancing service comprising:
   a routing table mapping object class identifiers to target identifiers, at least one of the mapped object class identifiers mapped to a target identifier identifying a target exhibiting a favorable processing metric for processing objects having an object class of the mapped object class identifier; and
   a system service for receiving an object related resource request comprising a supplied object class identifier matching an object class identifier in the table, the system service operative to route the resource request to the target identified by the target identifier mapped to by the supplied class identifier in the routing table.

14. The service of claim 13 wherein the system service is an operating system service.

15. The service of claim 13 wherein the target identifiers in the routing table identify server computers in the computer network.

16. The service of claim 13 wherein target identifiers in the routing table identify threads at server computers in the computer network.

17. The service of claim 13 wherein the target identifiers in the routing table identify processes at server computers in the computer network.

18. The load balancing service of claim 13 further comprising:
   a collective metric data store operative to receive performance values indicative of the targets' performance according to a processing metric; and
   a load balancing engine operative to dynamically adjust mappings in the routing table to map an object class identifier to a target identifier identifying a target having a more favorable performance value in the collective metric data store according to the processing metric.

19. The load balancing service of claim 18 wherein the collective metric data store comprises a dampened performance value indicative of a plurality of blended received performance values, at least certain of the blended received performance values of sufficient age to dampen variance in the dampened performance value in the collective metric data store; and
   the load balancing engine consults the dampened performance value to dynamically adjust mappings in the routing table.

20. In a router computer, a load balancing service for distributing an object creation request comprising an object creation request characteristic among a target group comprising a plurality of server computers, the load balancing service comprising:
   a host server computer selection means for selecting a host server computer to host the object creation request, the host server computer selection means operative to accept a supplied object creation request characteristic and specify a selected host server computer, the specified host server computer selected by the host server computer selection means from the target group based on the specified object creation request characteristic;
   a system service for routing the component creation request to a server computer in the target group, the system service operative to accept the component creation request comprising the object creation request characteristic, supply the object creation request characteristic to the host server computer selection means, accept from the host server computer selection means a specified selected host server computer and route the object creation request thereto.

21. The load balancing service of claim 20 wherein the object creation request characteristic of the object creation request is a class identifier, and the host server computer selection means specifies a server computer having an activated instantiated object of the class identifier.

22. The load balancing service of claim 20 wherein the object creation request characteristic of the object creation request is a client identity identifying a client computer, and the host server computer selection means specifies a server computer to which object creation requests for the client computer have previously been routed based on the previously-routed requests.

23. The load balancing service of claim 20 wherein the object creation request characteristic is selected from the group consisting of a class identifier of the object creation request, a client computer identity of a computer issuing the object creation request, and a process identity of a process issuing the object creation request.

24. The load balancing service of claim 20 wherein the object creation request is generated by a process executing in an execution environment with associated environment data defining the execution environment, and the object creation request characteristic of the object creation request is the execution environment data.

25. The load balancing service of claim 20 wherein the target group is dynamically adjustable to add or remove a specified server computer from the group based on instructions provided by the specified server computer to the router computer.

26. The load balancing service of claim 20 wherein the object creation request characteristic of the object creation request is a class identifier, the load balancing service further comprising:
   a global routing table mapping object class identifiers to host server computers in the target group,
   wherein the host server computer selection means consists of a mapping function on the global routing table.

27. The load balancing service of claim 26 wherein the global routing table is dynamically updated with processing metric data retrieved from the server computers in the target group.

28. The load balancing service of claim 27 wherein the processing metric data is generated by a RPC layer between the router computer and the server computers.

29. In a computer network, an object creation architecture for balancing a load of object creation requests among a plurality of server computers, the architecture comprising:
   a routing table comprising a plurality of stored object class identifiers, wherein at least one stored object class identifier is associated with a server computer;
   at a router computer, a load balancing service responsive to a supplied object class identifier in an object creation request from a client program on a client computer and operative to select a server associated with the supplied object class identifier in the routing table, the load balancing service further operative to route the object creation request to an object creation service at the selected server computer;
   at the selected server computer, an object creation service responsive to the object creation request from the load balancing service and operative to create a server object of an object class associated with the supplied identifier and further operative to assemble a stub with the server object, the stub operative to monitor calls to the server object to observe and store in a metric data store at the selected server computer a performance value, the performance value indicative of performance at the selected server computer according to a processing metric;

at the router computer, a metric collector operative to retrieve the observed performance value from the metric data store and integrate the performance value into a collective metric data store, wherein the collective metric data store comprises metric data from plural server computers; and a load balancing engine at the router computer operative to consult the collective metric data store and associate in the routing table an object class identifier with a server having a performance value determined superior according to the processing metric by the load balancing engine.

30. The architecture of claim 29 wherein the load balancing engine is a first load balancing engine operative to associate a first class identifier with a server, the architecture further comprising:

a second load balancing engine operative to consult the collective metric data store and associate in the routing table a second class identifier with a server having a performance value determined superior according to the processing metric by the second load balancing engine.

31. In a computer network comprising a router computer, a plurality of server computers and a plurality of client computers, an architecture for balancing a load of computer object processing among the server computers, the architecture comprising:

a routing table at the router computer associating object classes with server computers;

a monitor at a server computer, the monitor operative to intercept a reference to an instantiated first software object of a monitored object class to transparently conduct and record a processing metric observation, the monitor further operative to send a processing metric value based on the processing metric observation and indicative of performance at the server computer;

a load balancing service at the router computer, the load balancing service operative to receive a client computer request to create a second object of the monitored object class and route the request to a selected server associated with the monitored object class in the routing table, the load balancing service responsive to the processing metric value sent by the monitor to associate a server having a favorable processing metric value with the monitored object class in the routing table; and an object creation service at the selected server operative to receive the request from the load balancing service and create an object of the monitored object class.

32. The architecture of claim 31 wherein the load balancing service comprises a plurality of load balancing engines, each load balancing engine operative to modify associations in the routing table relating to an object class particular to the load balancing engine.

33. The architecture of claim 31 wherein the monitor comprises a plurality of metric trackers, each metric tracker operative to conduct and record a performance metric observation relating to an object class particular to the metric tracker.

34. In a computer network having a router computer and a plurality of server computers in a target group, a method for balancing object processing among the plurality of server computers, the method comprising:

conducting plural processing performance metric observations associated with a software object class at a server computer;

periodically blending the observations into a representative value indicative of performance at the server computer;

periodically transferring the representative value from the server computer to a router computer to provide plural successive representative values to the router computer, wherein transferring is sufficiently delayed to facilitate blending a number of observations to dampen variance in the successive representative values;

receiving at a router computer the plural representative values from the server computer and plural representative values from at least one other server computer in the target group; and routing resource requests received by the router computer to a server computer in the target group having a representative value indicative of more favorable performance than another server computer in the target group.

35. The method of claim 34 wherein the blending step comprises calculating the average of plural response times observed at the server computer.

36. In a computer network comprising a client computer and a server computer, a computer implemented method for accommodating object transparent rebalance messages from the server computer to the client computer, the method comprising:

generating a proxy at the client computer for receiving and forwarding calls from a client program to a software object;

generating a stub at the server computer for receiving and forwarding calls from the proxy to the software object;

establishing a connection between the proxy and the stub;

providing the proxy with rebalance message receptive code run by the proxy transparently to the server object and the client program;

providing the stub with rebalance message generating code run by the stub transparently to the server object and the client program;

when the stub is referenced, determining in the rebalance message generating code whether performance at the server computer is below an acceptable minimum; and if performance at the server computer is below the acceptable minimum, sending a rebalance message from the rebalance message generating code to the rebalance message receptive code.

37. The method of claim 36 wherein the software object is a first software object, the method further comprising:

upon receiving a rebalance message in the rebalance receptive code, severing the connection between the proxy and the stub and creating a second software object on a computer other than the server computer.

38. A load balancing service for balancing object processing among a plurality of server computers by accommodating object creation requests from a plurality of client programs executing on a plurality of client computers, the load balancing service comprising:

at a client computer, a configuration database for associating object classes with remote computers, at least one object class in the configuration database associated with a router computer;

at the client computer, an operating system service operative to receive an object creation request comprising an object class, the operating system service further operative to direct the object creation request to a computer associated with the object class in the configuration database;

at the router computer, a routing table for associating an object class with a server computer;

at the router computer, a routing service operative to receive the object creation request from the client computer and route the request to a selected server computer associated with the request's object class in the routing table;

at the selected server computer, a class instance creator operative to receive the object creation request and create an object of the request's object class;

an operating system service for providing a wrapper around the object, the wrapper comprising a method invocation service, the method invocation service operative to receive invocations of a method of the object from a client program and forward the invocation to the object, the method invocation service further operative to observe execution of the method by the object to produce an object class method performance observation, the object class method performance observation associated with the object class of the object and indicative of the method's performance according to a processing metric;

an observation collection service at the router computer operative to collect and store the object class method performance observation and at least one other object class method performance observation in a collective observation store from a target group, the target group comprising the selected server computer and other plural server computers; and a load balancing engine at the router computer operative to evaluate the object class method performance observations from the target group to associate a favorable server computer in the target group with a selected object class in the routing table, the evaluated observations associated with the selected object class in the collective observation store, the favorable server computer having a more favorable object class method performance observation than another server in the target group according to the processing metric.

39. The computer-readable medium of claim 38 wherein the processing metric is response time for a method of an object of the object class indicated by the selected identifier indicative of an object class, and the data structure is sharable among a plurality of load balancing engines at the router computer and an activator at the router computer.

40. A computer-readable medium having stored thereon a data structure for routing object creation requests from a remote client computer, the data structure comprising:

identifiers indicative of an object class; and a server identifier associated in the data structure with a selected one of the identifiers indicative of an object class, the server identifier indicative of a server computer providing to a router computer favorable processor metric observations for processing objects of the object class indicated by the selected one of the identifiers indicative of an object class;

wherein the data structure is an accelerated routing table comprising a lookup table associating a server identifier with a hash function of an identifier indicative of an object class.

* * * * *

UNITED STATES PATENT AND TRADEMARK OFFICE
CERTIFICATE OF CORRECTION

PATENT NO. : 6,473,791 B1
DATED : October 29, 2002
INVENTOR(S) : Al-Ghosien et al.

It is certified that error appears in the above-identified patent and that said Letters Patent is hereby corrected as shown below:

<u>Title page,</u>
Item [56], References Cited, U.S. PATENT DOCUMENTS, the following additional references should appear:
-- 4,800,488    1/1989  Agrawal et al.
   5,133,075    6/1992  Risch
   5,577,252  11/1996  Nelson et al. --

OTHER PUBLICATIONS, the following additional references should appear:
-- Gray et al., "The Role of a Compensating Transaction," *Transaction Processing: Concepts and Techniques*, pp. 204-205, 1993.

McKay, "Microsoft talks up tools," *Infoworld*, May 11, 1998.

Sessions, Sharing and Scalability," *COM and DCOM: Microsoft's Vision for Distributed Objects*, Chap. 6, pp. 249-313, 1998.

Sessions, "Clustering," *COM and DCOM: Microsoft's Vision for Distributed Objects*, Chap. 10, pp. 413-442, 1998.

Kiczales, "Going Beyond Objects for Better Separation of Concerns in Design and Implementation," *Aspect-Oriented-Programming*, 1997, 1998.

Lopes et al., "Proceedings of the Aspect-Oriented Programming Workshop at ECOOP '98," 1998.

Lopes et al., "Proceedings of the Aspect-Oriented Programming Workshop at ECOOP '97," 1997.

"Implementing locale as dynamically loaded shared object files," *IBM Technical Disclosure Bulletin*, US, IBM Corporation, New York, 34(12):117-118, 1992.

Nierstrasz, "Active Objects in Hybrid," *Proc. of OOPSLA* 22(12):243-253, 1987.

Orfali et al., "RPC, Messaging and Peer-to-Peer," *Survival Guide*, Ch. 9, John Wiley & Sons, Inc., pp. 119-128, 1994.

Hamilton (ed.), "JavaBeans[TM]," Sun Microsystems, Version 1.01, pp.1-114, July, 1997.

Hurwicz, "Multicast to the Masses: The IP multicast standard is ready, but the infrastructure isn't," *BYTE* Magazine, pp. 1-10, June, 1997.

UNITED STATES PATENT AND TRADEMARK OFFICE
CERTIFICATE OF CORRECTION

PATENT NO.   : 6,473,791 B1
DATED        : October 29, 2002
INVENTOR(S)  : Al-Ghosien et al.

It is certified that error appears in the above-identified patent and that said Letters Patent is hereby corrected as shown below:

OTHER PUBLICATIONS cont'd,
"Managing Performance/Reliability Trade-Offs," *BYTE* Magazine, pp. 1-2, February, 1998.

"Monkey in the Middleware," *BYTE* Magazine, pp. 1-2, February, 1998.

Montgomery, "Distributing Components: For COBRA and DCOM it's time to get practical," *BYTE* Magazine, Special Report, pp.1-10, April, 1997.

Skeen, "Enabling the Real-Time Enterprise," *BYTE* Magazine, Core Technologies, pp. 1-10, April, 1997.

Matena et al., "Enterprise JavaBeans™," Version 1.0 Specification, *Sun Microsystems*, pp. 1-181, March 21, 1998.

"The Component Object Model: Technical Overview," Microsoft Corporation, pp. 1-17, available at www.microsoft.com/com/wpaper/Com modl.htm, 1996.

Seetharaman, "The CORBA Connection," *Communications of the ACM*, Vol., 31, No. 10, pp. 34-36, October 1998.

Siegel, "OMG Overview: CORBA and the OMA in Enterprise Computing", *Communications of the ACM*, Vol. 41, No.10, pp. 54-60, October 1998.

Vinoski, "New Features for CORBA 3.0," *Communications of the ACM*, Vol. 41, No.10, pp. 44-52, October 1998.

Schmidt, "Evaluating Architectures for Multithreaded Object Request Brokers," *Communications of the ACM*, Vol. 41, No. 10, pp. 73-79, October 1998.

Henning, "Binding, Migration, and Scalability in CORBA," *Communications of the ACM*, Vol. 41, No. 10, pp. 62-71, October 1998.

Haggerty et al., "The Benefits of CORBA-Based Network Management," *Communications of the ACM*, Vol. 41, No. 10, pp.73-79, October 1998.

UNITED STATES PATENT AND TRADEMARK OFFICE
CERTIFICATE OF CORRECTION

PATENT NO.    : 6,473,791 B1
DATED         : October 29, 2002
INVENTOR(S)   : Al-Ghosien et al.

It is certified that error appears in the above-identified patent and that said Letters Patent is hereby corrected as shown below:

OTHER PUBLICATIONS cont'd,
Davis, "Inside IBM's System View," *Datamation*, Vol. 37, No. 4, p. 62, February 25, 1991.

Schwartz et al., "Intel's Middleware Move: Company Ponders Initiatives for Common Object Services," *InfoWorld*, Vol. 20, No. 9, p. 1, March 2, 1998. --

Signed and Sealed this

Twenty-second Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,473,791 B1
DATED         : October 29, 2002
INVENTOR(S)   : Mohsen Al-Ghosein et al.

It is certified that error appears in the above-identified patent and that said Letters Patent is hereby corrected as shown below:

Delete the title page and substitute therefore the attached title page.

Delete the specification, columns 1-16 and insert therefore the attached specification, columns 1-30.

Signed and Sealed this

Twenty-eighth Day of December, 2004

JON W. DUDAS
*Director of the United States Patent and Trademark Office*

(12) United States Patent
Al-Ghosein et al.

(10) Patent No.: US 6,473,791 B1
(45) Date of Patent: Oct. 29, 2002

(54) OBJECT LOAD BALANCING

(75) Inventors: Mohsen Al-Ghosein, Redmond, WA (US); Jan S. Gray, Redmond, WA (US); Amit Mital, Kirkland, WA (US); Rodney Limprecht, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/135,106

(22) Filed: Aug. 17, 1998

(51) Int. Cl.⁷ .................................................. G06F 9/42
(52) U.S. Cl. ........................ 709/217; 709/100; 709/313; 709/315; 709/203; 709/224; 709/225
(58) Field of Search ......................... 709/100, 101–108, 709/310, 312, 315, 317, 320, 203, 223, 224, 217, 330

(56) References Cited

U.S. PATENT DOCUMENTS

| | | |
|---|---|---|
| 4,752,928 A | 6/1988 | Chapman et al. |
| 5,093,914 A | 3/1992 | Coplien et al. |
| 5,125,091 A | 6/1992 | Staas, Jr. et al. |
| 5,151,987 A | 9/1992 | Abraham et al. |
| 5,168,441 A | 12/1992 | Onarheim et al. |
| 5,179,702 A | 1/1993 | Spix et al. |
| 5,212,793 A | 5/1993 | Donica et al. |
| 5,315,703 A | 5/1994 | Matheny et al. |
| 5,442,791 A | 8/1995 | Wrabetz et al. |
| 5,459,837 A | 10/1995 | Caccavale |
| 5,485,617 A | 1/1996 | Stutz et al. |
| 5,524,238 A | 6/1996 | Miller et al. |
| 5,574,918 A | 11/1996 | Hurley et al. |
| 5,577,251 A | 11/1996 | Hamilton et al. |
| 5,579,520 A | 11/1996 | Bennett |
| 5,687,370 A | 11/1997 | Garst et al. |
| 5,689,708 A | 11/1997 | Regnier et al. |

(List continued on next page.)

FOREIGN PATENT DOCUMENTS

| | | |
|---|---|---|
| EP | 0559100 A2 | 2/1993 |
| EP | 0623876 A2 | 3/1994 |
| EP | 0638863 A1 | 10/1994 |
| EP | 0738966 A | 4/1996 |
| EP | 0777178 A | 11/1996 |

OTHER PUBLICATIONS

"An Object–Oriented Database System Jasmine: Zmplementation Application, and Exlension", Hiroshi Ishikawa, et al., Apr. 1996.*
Orfali et al., The Essential Distributed Objects Survival Guide, pp. 423–452, 1996.
Brockschmidt, Inside Ole, pp. 277–338, 1995.
Nance, Balance the Load with Transaction Sever, BYTE Magazine, pp. 1–8, 1997.
Tomsen, "Virtually Crash Proof Your Web Site with IISS4.0," *Microsoft Interactive Developer*, vol. 2, No. 10, pp. 41–46, Oct., 1997.

(List continued on next page.)

*Primary Examiner*—Majid Banankhah
(74) *Attorney, Agent, or Firm*—Klarquist Sparkmann, LLP

(57) ABSTRACT

A load balancing architecture routes object creation requests to server computers based on the object's class or some other characteristic. The architecture operates transparently to the object and the client program creating the object. A monitoring service at the servers observes a processing metric such as response time and provides the observations to a router computer. A load balancing engine at the router computer analyzes the observations to dynamically adjust routing, directing object creation requests to server computers having favorable performance. Analysis of observations is delayed to facilitate blending and dampening. Although a default load balancing engine is provided, software developers can specify a different engine per object class, and the engines can be tailored to the behavior of a particular object class. Load balancing is extensible to threads and processes. If performance at a server falls below an acceptable level, a rebalance policy transparently sends a rebalance message, breaking the connection to the server.

41 Claims, 10 Drawing Sheets

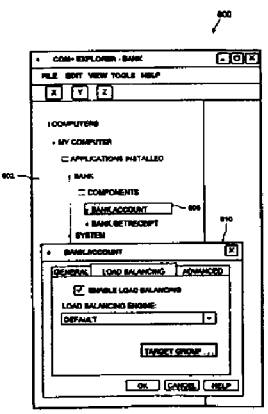

U.S. PATENT DOCUMENTS

| | | |
|---|---|---|
| 5,752,038 A | 5/1998 | Blake et al. |
| 5,765,174 A | 6/1998 | Bishop et al. |
| 5,790,789 A | 8/1998 | Suarez |
| 5,802,291 A | 9/1998 | Balick et al. |
| 5,838,916 A | 11/1998 | Domenikos et al. |
| 5,881,225 A | 3/1999 | Worth |
| 5,884,316 A | 3/1999 | Bernstein et al. |
| 5,890,161 A | 3/1999 | Helland et al. |
| 5,907,675 A | 5/1999 | Aahlad |
| 5,941,947 A | 8/1999 | Brown et al. |
| 5,958,004 A | 9/1999 | Helland et al. |
| 5,958,010 A | 9/1999 | Agarwal et al. |
| 6,014,666 A | 1/2000 | Helland et al. |
| 6,026,428 A | 2/2000 | Hutchison et al. |
| 6,105,147 A | 8/2000 | Molloy |
| 6,134,594 A | 10/2000 | Helland et al. |

OTHER PUBLICATIONS

Go, "Intranet load-balancing solutions: Balance on the back end," *InfoWorld*, pp. 72–86, Mar., 1998.

Lam, "Building Scalable Apps," *PC Tech Magazine*, pp. 209–214, Apr., 1998.

"DCOM Technical Overview," Microsoft Press, pp. 1–32, Apr., 1998.

Horstmann & Kirtland, "DCOM Architecture," Microsoft Press, pp. 1–55, Apr., 1998.

U.S. patent application Ser. No. 09/071,594, Fox et al., filed May 1, 1998.

Jajodia, "Database Security and Privacy," (Tucker, editor) *The Computer Science and Engineering Handbook*, chapter 49, pp. 1112–1124 (Dec. 1996).

Sandhu, "Authentication, Access Control, and Intrusion Detection," (Tucker, editor) *The Computer Science and Engineering Handbook*, chapter 91, pp. 1929–1948 (Dec. 1996).

Moffett, J.D., Specification of Management Policies and Discretionary Access Control. In M. S. Sloman, editor, Network and Distribution Systems Management, chapter 17, pp. 455–479. Addison–Wesley, 1994.

Sloman, M. and Moffett, J.D., "Managing Distributed Systems", Domino Project Report, Imperial College, U.K. Sep. 1989.

Wiederhold, G.: Mediators in the Architecture of Future Information Systems. IEEE Computer, 25(3), 1992.

Sloman, M.S., Policy Driven Management for Distributed Systems. Journal of Network and Systems Management, 2(4): 333–360, Plenum Press Publishing, 1994.

Moffett, J.D. and Sloman, M.S., Policy Hierarchies for Distributed Systems Management. IEEE Journal on Selected Areas in Communications, Special Issue on Network Management, 11(9):1404–1414, Dec. 1993.

Gile, S., Reporting Application Usage in a LAN Environment, New Centerings in Computing Serives, pp. 147–159 (1990).

Moffett, J.D. and Sloman M.S., (1991b), The Representation of Policies as System Objects, Proceedings of the Conference on Organisational Computer Systems (COCS'91) Atlanta, GA, Nov. 5–8, 1991, in SIGOIS Bulletin vol. 12, Nos. 2 & 3, pp. 171–184.

Barkely, "Role Based Access Control (RBAC)," Software Diagnostics and Conformance Testing National Institute of Standards and Technology, pp. 1–27, Mar. 1998.

Cugini and Feraiolo, "Role Based Access Control Slide Set—May 1995," National Institute of Standards and Technology, pp. 1–25, May 1995.

Ferriaolo and Barkley, "Specifying and Managing Role-Based Access Control Within a Corporate Intranet," National Institute of Standards and Technology, pp. 1–6, 1997.

Ferraiolo and Kuhn, "Role-Based Access Control," Reprinted from *Proceedings of 15th National Computer Security Conference*, pp. 1–11, 1992.

Orfali, Harkey, Edwards, "Client/Server Transaction Processing," *Essential Client/Server Survival Guide*, pp. 241–288, 1994.

Limprecht, "Microsoft Transaction Server," *Compcon '97. Proceedings, IEEE*, pp. 14–18, 1997.

Chappell, "The Microsoft Transaction Server (MTS)—Transaction Meet Components," http://www.microsoft.com/Com/wpaper/mtscomp.asp, Feb. 1998.

Orfali et al., "CORBA Services: System Management and Security," *The Essential Distributed Objects Survival Guide*, pp. 183–202, 1996.

"The Common Object Request Broker: Architecture and Specification," Revision 2.0, pp. 2-1 through 2-17, Jul. 1995.

U.S. patent application Ser. No. 08/959,139, Helland et al., filed Oct. 28, 1997.

U.S. patent application Ser. No. 08/959,149, Limprecht et al., filed Oct. 28, 1997.

"The Common Object Request Broker: Architecture and Specification," Revision 2.0, pp. 4–12 through 4–16, Jul. 1995.

Landwehr, "Protection (Security) Models and Policy," *The Computer Science and Engineering Handbook*, (Tucker, Ed.), CRC Press, pp. 1914–1928, 1997.

Bowen, "Intel's Middleware Move," *InfoWorld*, vol. 20, No. 9, pp. 1–2, Mar. 2, 1998.

Bochenski, *IBM's SystemView*, 1st Edition, Computer Technology Research Corporation, pp. 1–143, 1991.

Schiemann et al., "A New Approach for Load Balancing in High-Performance Decision Support Systems," Future Generation Computer Systems, vol. 12, No. 5, pp. 345–355, Apr. 1, 1997.

\* cited by examiner

OBJECT LOAD BALANCING

TECHNICAL FIELD

The present invention relates to an object-based distributed computing model. More specifically, the invention relates to balancing an object-related resource load among a group of server computers.

BACKGROUND OF THE INVENTION

In many information processing applications, a server application running on a host or server computer in a distributed network provides processing services or functions for client applications running on terminal or workstation computers of the network which are operated by a multitude of users. Common examples of such server applications include software for processing class registrations at a university, travel reservations, money transfers and other services at a bank, and sales at a business. In these examples, the host or server computers access various resources to provide functionality to the client applications over the network. For example, a server computer might respond to a customer order from a client computer by consulting and updating price and inventory databases.

An important consideration in many of these applications is the ability to handle heavy processing loads. In the above application examples, for instance, the orders from a large number of users may be submitted to the server within a short time period. Processing each customer's order may consume significant processing resources. Thus, each additional user of the server application can slow the response or time to complete all other customers' orders, thus reducing the quality of service for all customers. Eventually, the load may exceed the processing capacity, possibly resulting in system failure, down time, and lost data. The degree to which a server can support incremental increases in user load while preserving performance is sometimes referred to as scalability.

One approach to enhancing scalability is to distribute processing among a group of server computers. For example, in a web server environment, a client computer with a web browser program requests web pages from a remote computer. To enhance scalability, various techniques can be used in a web server environment to accommodate a large number of requests in a short period. One approach is to send web page requests to a router, which directs the requests to a server computer designated to provide certain web pages. In this way, network traffic is divided among the server computers based on the web page requested. Another approach is to direct web page requests using a round robin or random server technique. This process of dividing processing among server computers is sometimes called load balancing.

Programming models generally known as object-oriented programming provide many benefits that have been shown to increase programmers' productivity, but the behavior of server applications developed with object-oriented programming models makes it difficult to achieve enhanced scalability using the above-described load balancing techniques. In object-oriented programming, programs are written as a collection of object classes which each model real world or abstract items by combining data to represent the item's properties with functions to represent the item's functionality. More specifically, an object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class.

Object-oriented programming generally has advantages in ease of programming, extensibility, reuse of code, and integration of software from different vendors and (in some object-oriented programming models) across programming languages. However, when object-oriented programming techniques are used to develop server applications, the server applications generally exhibit behavior not accommodated by the above-described load balancing techniques. For example, object-oriented applications typically create software objects on a server, and the software objects themselves may use resources or require creation of additional software objects while they reside on the server. By contrast, the above techniques assume that an incoming request is for a particular single resource, such as a web page. In addition, a software object may require its state be preserved between method calls. Accordingly, method calls from the client should be directed to the server on which the object was created so that the object's preserved internal state data can be readily accessed. By contrast, the above techniques assume that an incoming request can be routed to any server without regard to prior requests. As a result, the above-described load balancing techniques fail to address behavior characteristic of software objects and offer limited scalability to server applications employing software objects.

SUMMARY OF THE INVENTION

The present invention is an extensible object-based load balancing architecture for use with applications created using object-oriented programming techniques. A load balancing service in the architecture supports dynamic object-based load balancing among a plurality of servers to enhance server application scalability. Objects in the architecture need not have load balancing logic because load balancing logic is incorporated into the architecture. In other words, load balancing is achieved transparently to objects, and software developers need not tailor objects to the load balancing architecture. As a result, the architecture accommodates a wide variety of software objects, and application software developers can develop objects without regard for the load balancing arrangement. Software developers are freed to focus on incorporating business logic into objects and are relieved from developing their own load balancing architecture.

In one aspect of the invention, object creation requests are sent to a router computer, which sends the request to an appropriate server computer based on the object class supplied with the request. In this way, objects of an object class known to have particular resource requirements or certain patterns of behavior can be routed to a server best equipped to handle creating and hosting the objects.

In another aspect of the invention, dynamic load balancing is achieved by collecting information about a processing metric at the server computers and forwarding the information to a load balancing engine on the router computer. The load balancing engine modifies how the router computer divides object creation requests among the server computers. A default load balancing engine for monitoring response time is available, but system software developers can construct custom load balancing engines for particular applications. Processing metric information is collected transparently to the object and the client program using the object, again freeing application software developers from including load balancing logic in the application's objects.

In addition, a different load balancing engine can be specified for different object classes; thus, the load balancing engine can be tailored to specific object idiosyncrasies. Since the load balancing logic and the business logic are separated, developers can design load balancing engines independently of objects, and the load balancing logic or parameters can be modified after application deployment without affecting the business logic. Creating a load balancing service typically requires intimate knowledge of technical detail associated with communication networks and computer hardware. The architecture's arrangement has the further benefit of allowing one developer group with application development expertise to focus on the business logic of the server application, while another group with appropriate technical expertise develops the load balancing logic or associated load balancing engines. In this way, the benefits of load balancing can be more easily incorporated into both existing and future application software. Such an arrangement particularly facilitates the advancement of electronic commerce applications, which commonly require enhanced scalability and business logic that evolves over time.

In another aspect of the invention, the logic for selecting a server computer to host an object creation request is loosely coupled with the logic observing processing metrics to provide dampening of variance typical in processing metric data. As a result, load balancing engines avoid considering anomalous observations.

In another aspect of the invention, a rebalance arrangement transparently sends a notification to a client computer using an object on a server computer. The notification breaks the client-server connection and an object creation request is resubmitted. In this way, the server computer load can be rebalanced transparently, and the load balance architecture accommodates recycled objects and just-in-time activation.

In yet another aspect of the invention, servers are placed into a set called a target group. Target groups are extensible to encompass alternative resources, such as threads and processes.

Additional features and advantages of the invention will be made apparent from the following detailed description of an illustrated embodiment, which proceeds with reference to the accompanying drawings.

BRIEF DESCRIPTION OF THE DRAWINGS

FIG. 1 is a block diagram of a computer system that may be used to implement a method and apparatus embodying the invention for balancing a load of object creation requests among a group of servers.

FIG. 2 is block diagram showing a broad overview of an object-based load balancing architecture, including a router, server, and client computers such as those shown in FIG. 1.

FIG. 3 is a block diagram of a computer network showing a router computer receiving a client computer object creation request and routing the request to a server computer selected from a global routing table.

FIG. 4 is a block diagram of an object conforming to the Common Object Model specification of Microsoft Corporation.

Figure 5:
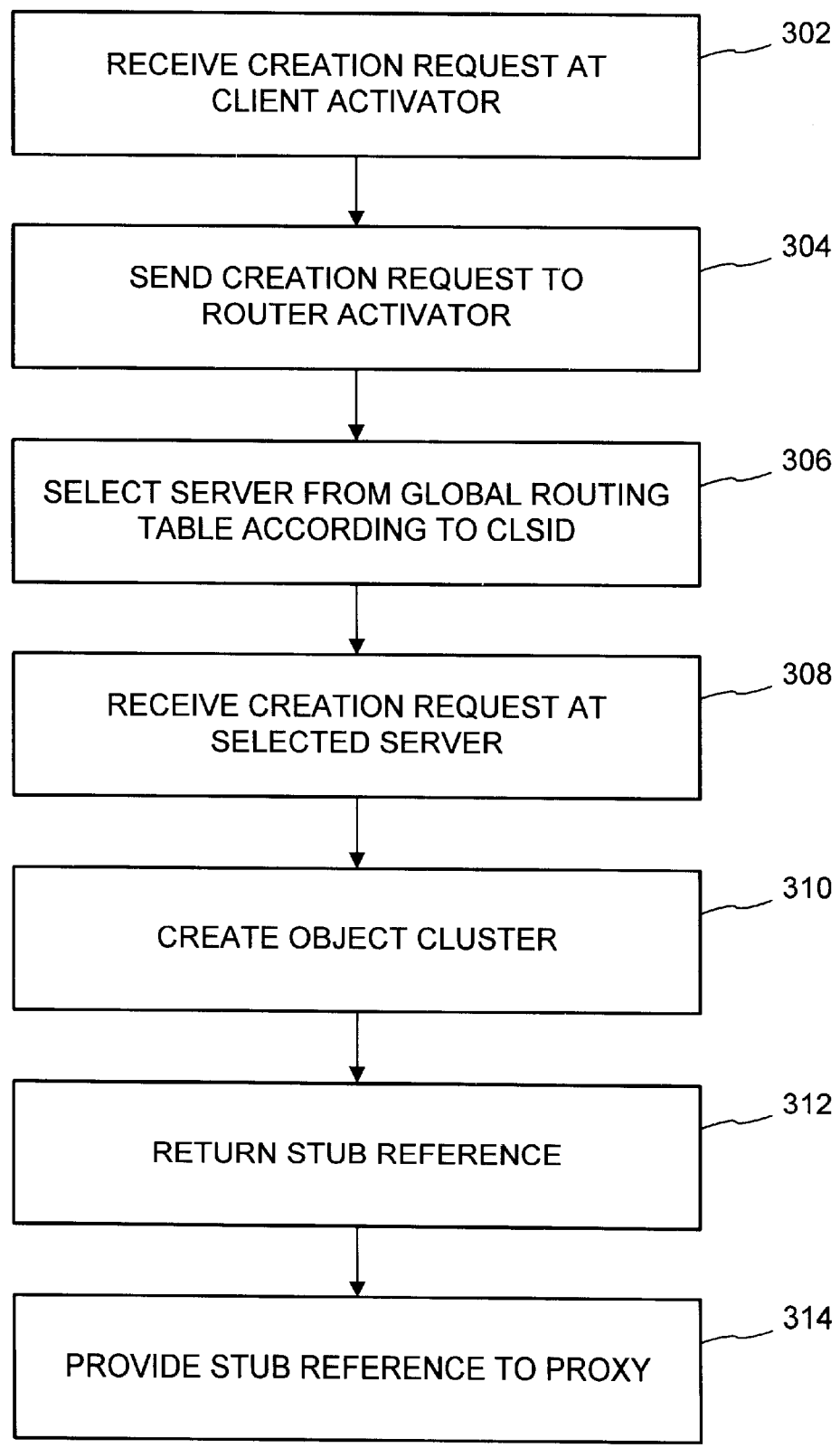
FIGS. 5A–5D are block diagrams representing various examples of how a plurality of policies may be combined to produce a final decision.
Figure 6:
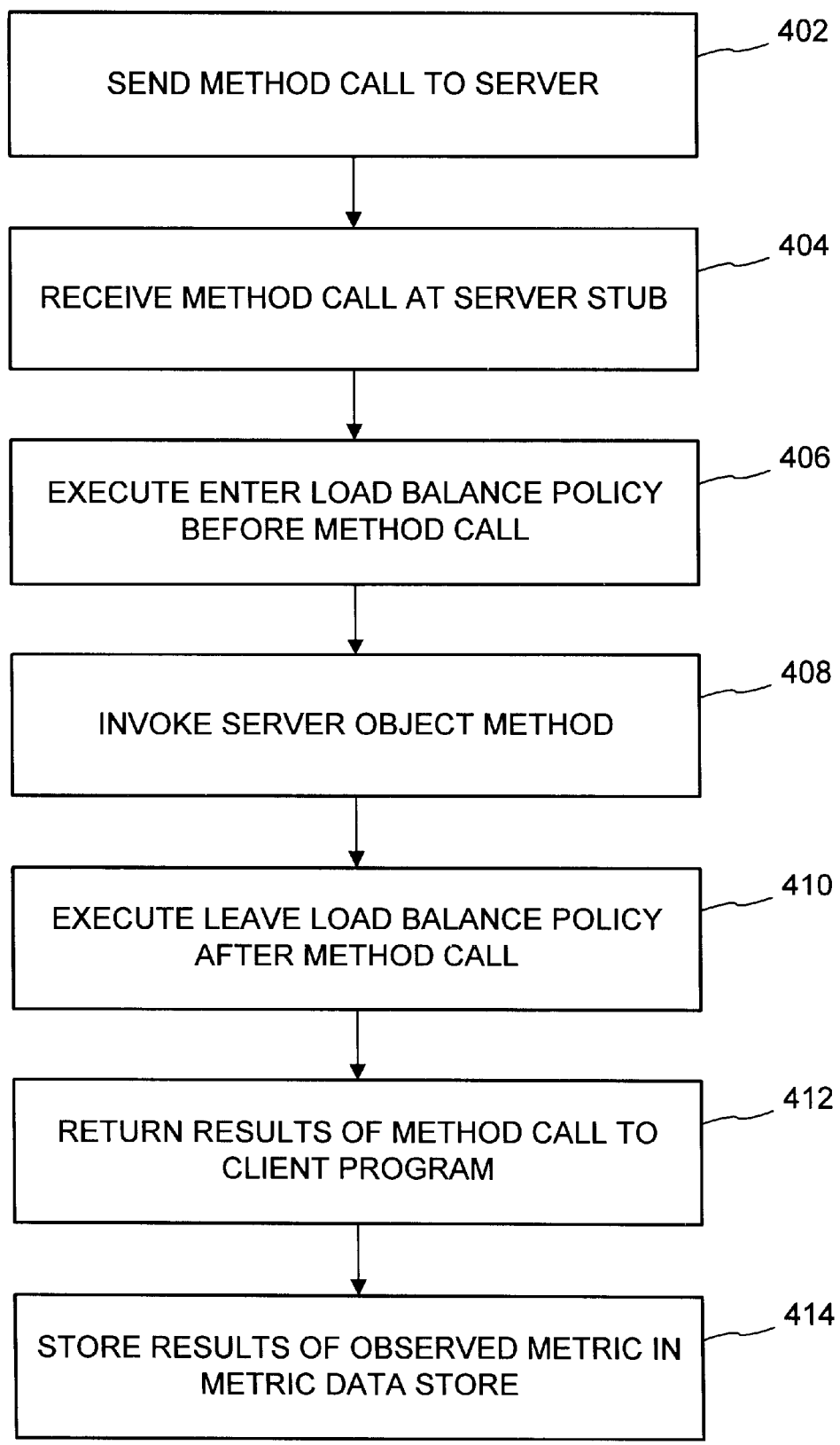
FIG. 6 is a representation of an editor mechanism for centrally administering policy objects.

FIG. 5 is a flowchart showing a method for creating an instance of a software object on a network such as that shown in FIG. 3.

FIG. 6 is a flowchart showing a method for invoking a method call to a software object, such as that created by the method shown in FIG. 5.

Figure 7:
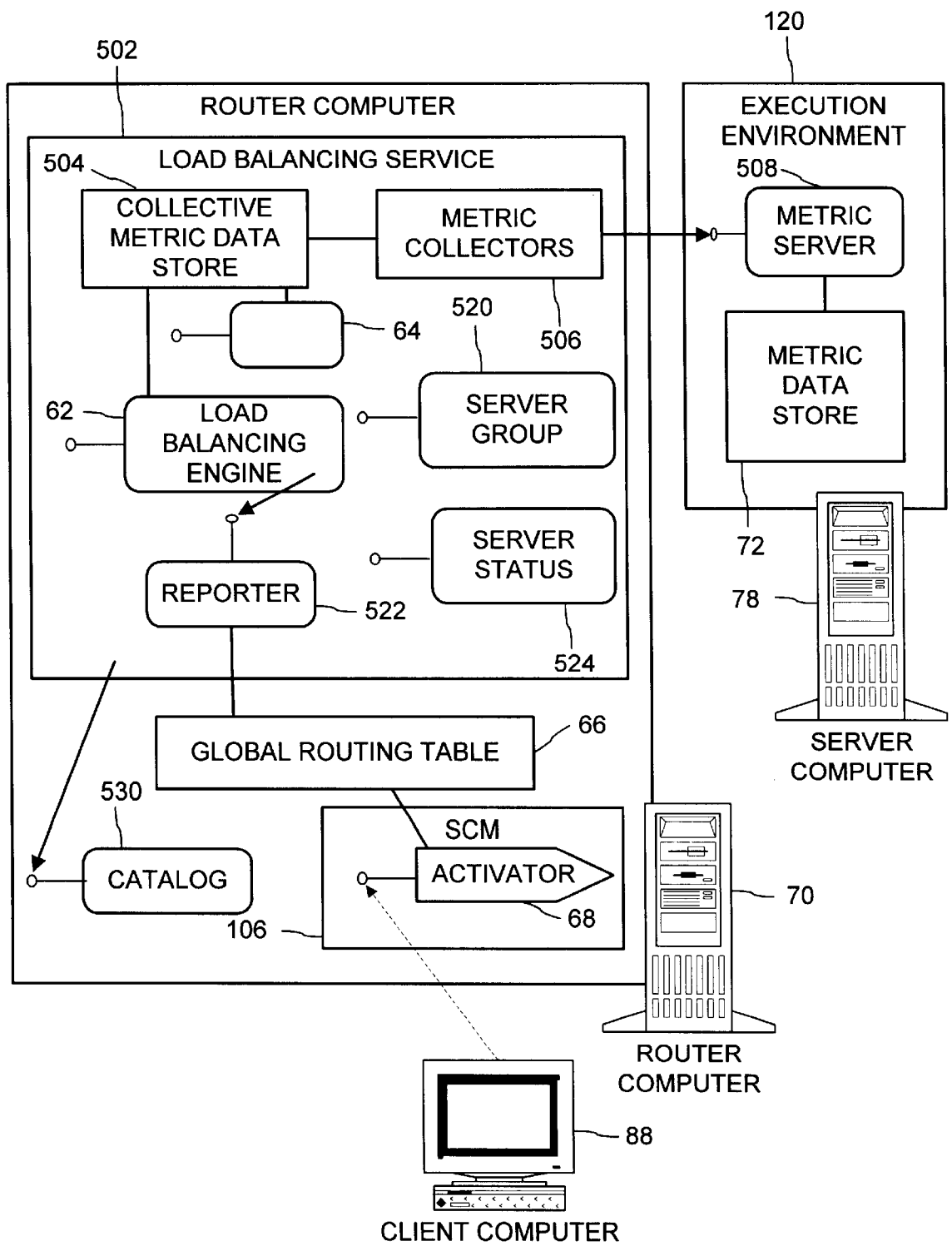

FIG. 7 is a block diagram showing a load balancing service on a router computer collecting information from a server computer over a network.

Figure 8:
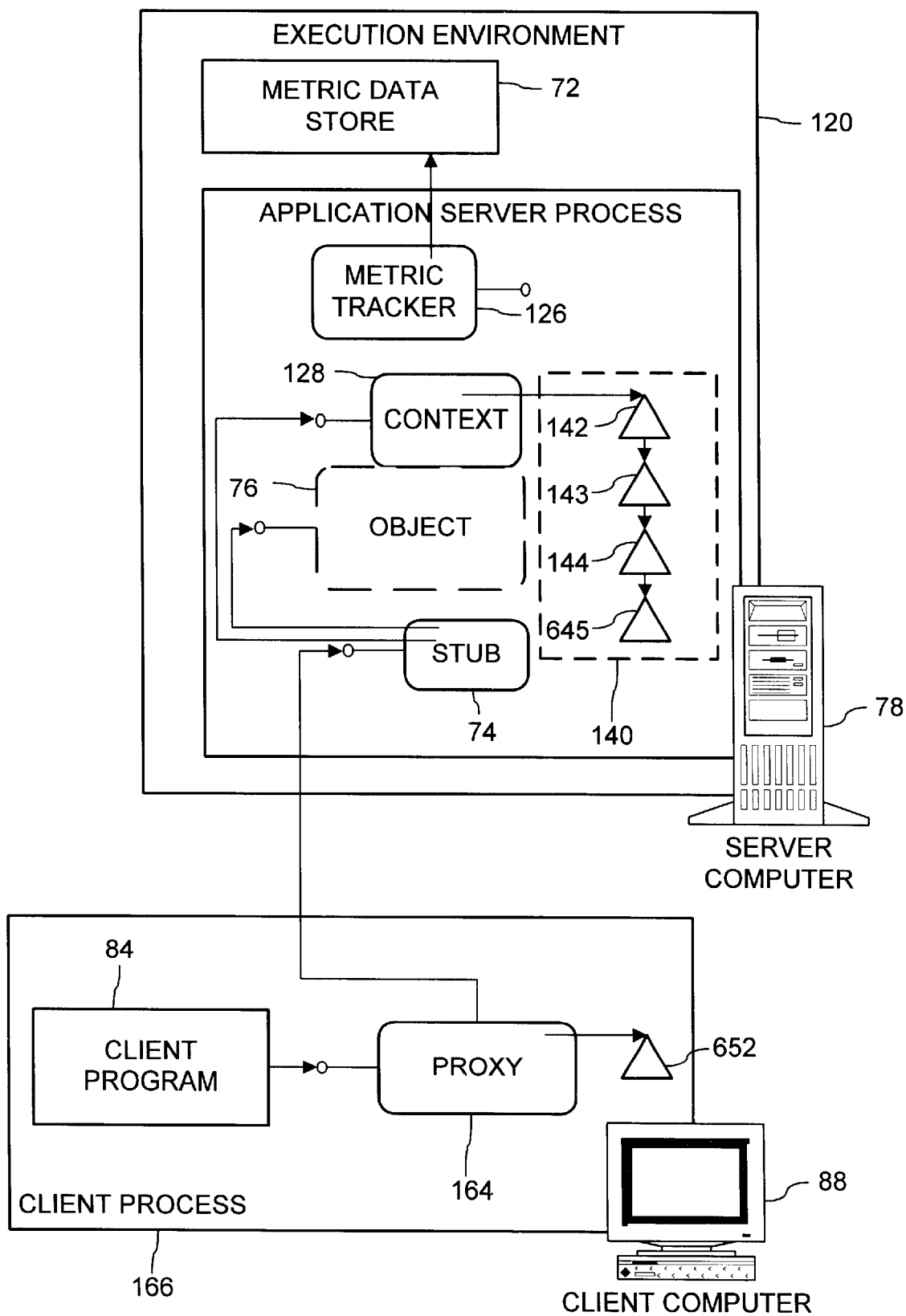

FIG. 8 is a block diagram showing a computer network with a client and server computer implementing a retry object policy for generating a rebalance message transparently to a server object and a client program.

Figure 9:
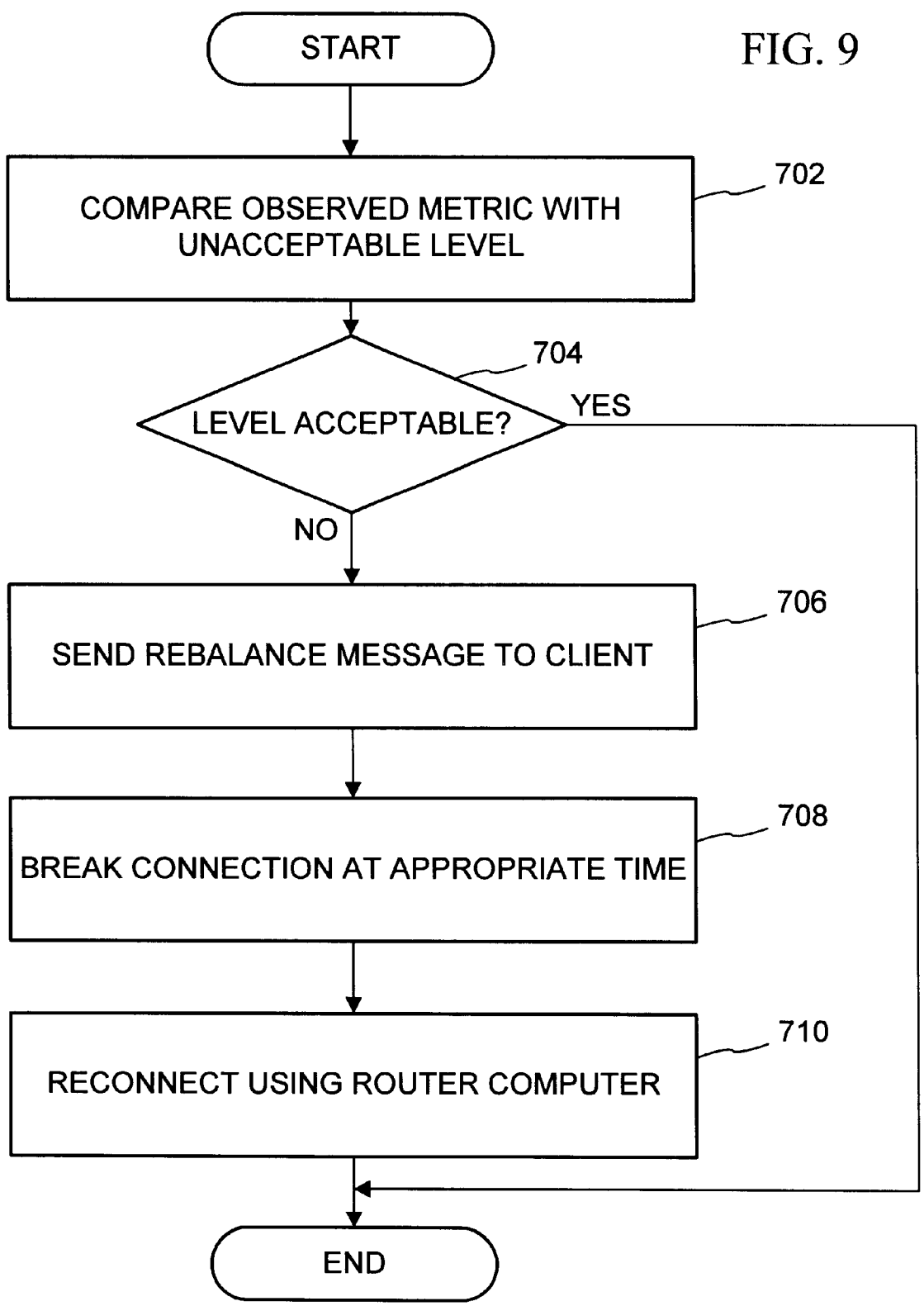

FIG. 9 is a flowchart showing a method for implementing a rebalance message over a computer network such as that shown in FIG. 2.

Figure 10:
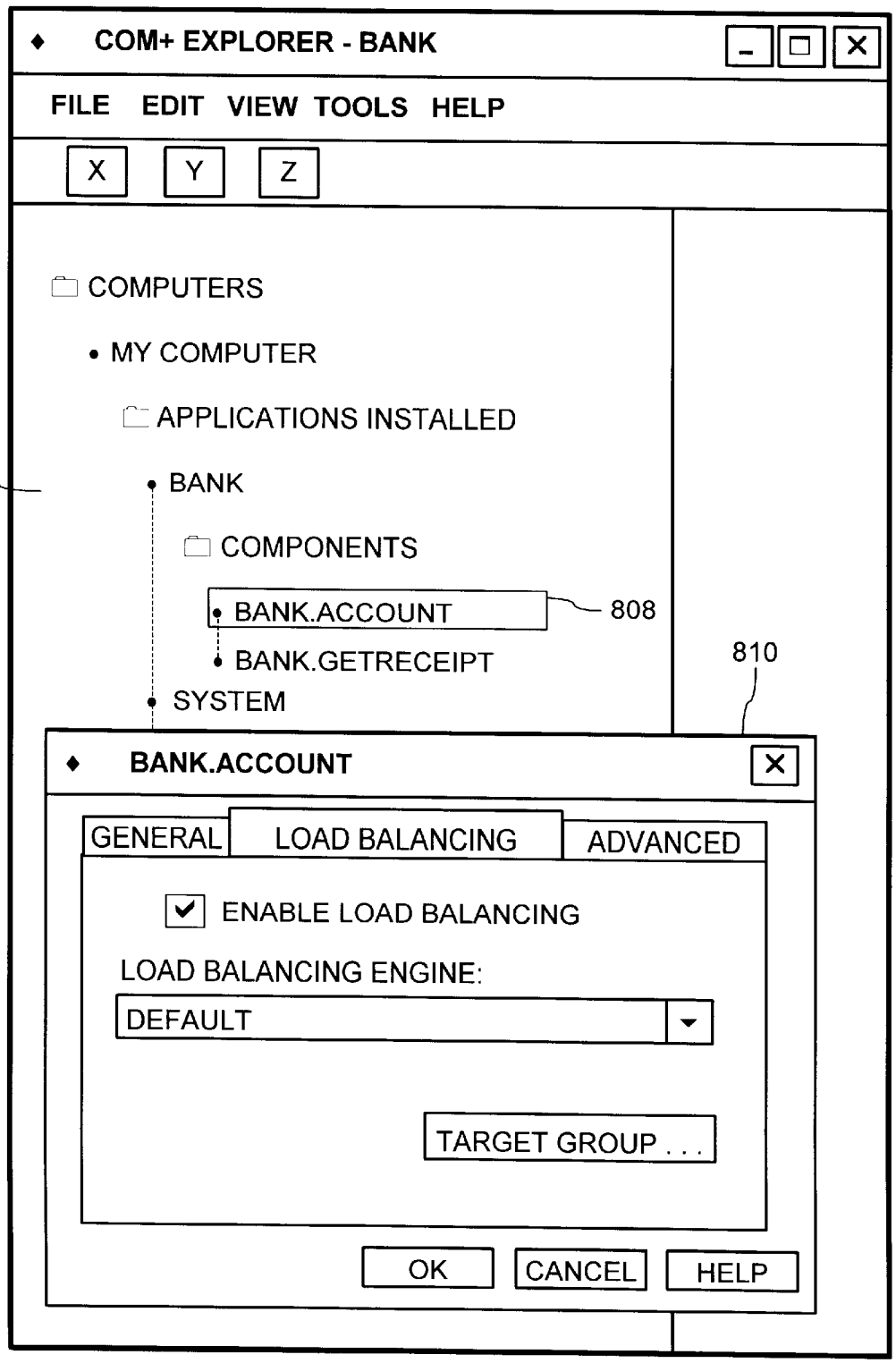

FIG. 10 is a view showing a user interface for configuring a load balance service such as that shown in FIG. 7.

DETAILED DESCRIPTION OF THE INVENTION

The present invention is directed toward a method and system for object-based load balancing. In one embodiment illustrated herein, the invention is incorporated into an object services component, entitled "COM+," of an operating system, entitled "Microsoft Windows NT Server 5.0," marketed by Microsoft Corporation of Redmond, Wash. Briefly described, this software is a scaleable, high-performance network and computer operating system supporting distributed client/server computing, and providing an object execution environment for object applications conforming to COM. The COM+ component incorporates object services from prior object systems, including Microsoft Component Object Model (COM), Microsoft Object Linking and Embedding (OLE), Microsoft Distributed Component Object Model (DCOM), and Microsoft Transaction Server (MTS).

Exemplary Operating Environment

FIG. 1 and the following discussion are intended to provide a brief, general description of a suitable computing environment in which the invention may be implemented. While the invention will be described in the general context of computer-executable instructions of a computer program that runs on a computer, those skilled in the art will recognize that the invention also may be implemented in combination with other program modules. Generally, program modules include routines, programs, components, objects, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. But, some embodiments of the invention can be practiced on stand alone computers. In a distributed computing environment, program modules may be located in both local and remote memory storage devices.

With reference to FIG. 1, an exemplary system for implementing the invention includes a conventional computer 20 (e.g., a server computer, a personal computer or other like computer), including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix and AMD; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the computer 20, such as during start-up, is stored in ROM 24.

The computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38.

A user may enter commands and information into the computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote computer 49. The remote computer 49 may be a server, a router, a peer device or other common network node, and typically includes many or all of the elements described relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Architecture Overview

FIG. 2 presents a broad overview of the load balancing architecture comprising computers such as the computer 20 (FIG. 1). A group of client computers 82 sends object creation requests to a router computer 70, which selects one of the server computers in the server group 80 to host the request. The illustrated computers are connected by a network, such as the Internet or an office LAN or WAN, over which the requests are sent.

A client program 84 running on the client computer 88 issues a request to create an object of a particular class (typically, an object of a server application that runs on server computers of the network). The request is directed to an activator 68 on the router computer 70, which selects an appropriate server computer from the server group 80 to process the object creation based on information in a global routing table 66. Typically, the global routing table 66 associates the class of the object with a particular server or servers. Then, the server object 76 and an associated stub 74 are created on the selected server computer. As described in more detail below, the stub 74 can monitor calls to the object 76 and is therefore sometimes called an object wrapper. The stub 74 forwards object references to the server object 76 and also observes and records a processing metric (e.g., response time), which is sent to a metric data store 72 with the assistance of other objects as described in more detail below. Information in the metric data store 72 is sent to the router computer 70 and used by a load balancing engine 62 to modify the global routing table 66. Thus, subsequent object creation requests are routed by the activator 68 according to the modified information in the global routing table 66. As requests from other client computers are routed to other server computers in the group 80, the other server computers similarly collect information in their own metric data stores, which is sent to the router computer 70 for use by the load balancing engine 62.

A default load balancing engine is provided, but the load balancing architecture can accommodate a different load balancing engine for use with objects of different classes. Thus, the load balancing engine can analyze observations with logic customized according to an object's particular behavior. Accordingly, the system can accommodate an additional load balancing engine 64 for processing data related to processing metric observations for another class of objects.

Since information is collected from the server group 80 on an ongoing basis, the router computer 70 routes object creation requests dynamically. For example, several requests might be sent to a first server computer until the load balancing engine 62 determines that the response time of the server has dropped below that of a second server computer. The load balancing engine 62 could then inform the activator 68 that objects should be created on the second server machine by modifying an entry in the global routing table 68. Thus, requests for the same class of objects might be sent to a different machine at different times, depending on observed processing metrics such as response time.

Server Application Execution Environment

With reference now to FIG. 3, the operating system of the server computer 78 provides run-time or system services to create a run-time execution environment 120 that supports control of a server object (e.g., the server object 76) over its state duration on the server computer 78. The operating system also provides services for thread and context management to the server object 76. The execution environment 120 is provided by a modified version of Microsoft Transaction Server, marketed by Microsoft Corporation. Microsoft Transaction Server is a well-known, widely available off-the-shelf software product providing an execution environment for software objects implementing transactions. In the illustrated embodiment, Microsoft Transaction Server is integrated in the operating system as part of the services provided by COM+.

The illustrated application server process ("ASP") 124 is a system process that hosts execution of server objects. Each ASP 124 can host multiple server objects that are grouped into a collection called an "application." Also, multiple ASPs 124 can execute on the server computer 78 under a multi-threaded, multi-tasking operating system (e.g., Microsoft Windows NT in the illustrated embodiment). Each ASP 124 provides a separate trust boundary and fault isolation domain for the server objects. In other words, when run in separate ASPs, a fault by one server object which causes its ASP to terminate generally does not affect the server objects in another ASP. In the illustrated embodiment, server objects are grouped as an application to be run together in one ASP 124 using an administration utility providing a graphical user interface for managing attributes associated with server objects, including grouping the objects into applications.

In a typical installation shown in FIG. 3, the execution environment 120 is on the server computer 78 (which may be an example of the computer 20 described above) that is connected in a distributed computer network comprising a large number of client computers 88 which access the server objects in the execution environment 120. Alternatively, the execution environment 120 may reside on a single computer and host server objects accessed by client processes also resident on that computer.

Server Objects

The server objects 76 hosted in the execution environment 120 of the ASP 124 implement the business logic of a server application, such as the code to manage class registrations in a university's registration application or orders in an on-line sales application. Typically, each server application comprises multiple objects, each of which contains program code for a portion of the application's work. For example, a banking application may comprise a transfer object, a debit account object, and a credit account object, which perform parts of the work of a money transfer operation in the application.

With reference now to FIG. 4, the server object 76 (FIG. 3) in the illustrated embodiment conforms to the Component Object Model ("COM") of Microsoft Corporation's OLE and ActiveX specifications (i.e., is implemented as a "COM Object"), but alternatively may be implemented according to other object standards including the CORBA (Common Object Request Broker Architecture) specification of the Object Management Group. OLE's COM specification defines binary standards for components and their interfaces, which facilitate the integration of software components. For a detailed discussion of OLE, see Kraig Brockschmidt, *Inside OLE, Second Edition*, Microsoft Press, Redmond, Wash., 1995.

In accordance with COM, the server object 76 is represented in the computer system 20 (FIG. 1) by an instance data structure 202, a virtual function table 204, and member functions 206–208. The instance data structure 202 contains a pointer 210 to the virtual function table 204 and data 212 (also referred to as data members, or properties of the object). A pointer is a data value that holds the address of an item in memory. The virtual function table 204 contains entries 216–218 for the member functions 206–208. Each of the entries 216–218 contains a reference to the code 206–208 that implements the corresponding member function.

The pointer 210, the virtual function table 204, and the member functions 206–208 implement an interface of the server object 76. By convention, the interfaces of a COM object are illustrated graphically as a plug-in jack as shown for the server object 76 in FIG. 3. Also, interfaces conventionally are given names beginning with a capital "I." In accordance with COM, the server object 76 can include multiple interfaces, which are implemented with one or more virtual function tables. The member function of an interface is denoted as "IInterfaceName::FunctionName."

The virtual function table 204 and member functions 206–208 of the server object 76 are provided by a server application program 220 (hereafter "server application DLL"), which is stored in the server computer 78 (FIG. 3)

as a dynamic link library file (denoted with a ".dll" file name extension). In accordance with COM, the server application DLL 220 includes code for the virtual function table 204 and member functions 206–208 of the classes that it supports, and also includes a class factory 222 that generates the instance data structure 202 for an object of the class.

Like any COM object, the server application object can maintain internal state (i.e., its instance data structure 202 including data members 212) across multiple interactions with a client (i.e., multiple client program calls to member functions of the object). The server object that has this behavior is said to be "stateful." The server object can also be "stateless," which means the object does not hold any intermediate state while waiting for the next call from a client.

Returning now to FIG. 3, before the server object 76 can execute in the illustrated execution environment 120, the server object 76 is first installed on the server computer 78. A typical object installation involves installing a group of related objects called an "application" (also known as a "package"). As with any COM object, the server object 76 is installed by storing the server application DLL file 220 (FIG. 4) that provides the server object 76 in data storage accessible by the server computer (typically the hard drive 27, shown in FIG. 1, of the server computer), and registering COM attributes (e.g., class identifier, path and name of the server application DLL file 220 (FIG. 4), etc. as described below) of the server objects in the system registry. The system registry is a configuration database.

In the execution environment 120 of FIG. 3, the server object 76 is executed under control of the operating system in the ASP 124. The operating system is responsible for loading the server application DLL 220 (FIG. 4) into the ASP 124 and instantiating the server object 76 using the class factory 222 (FIG. 4). The operating system further manages calls to the server object 76 from client programs (whether resident on the same computer or over a network connection).

The illustrated execution environment 120 imposes certain additional requirements on the server object 76 beyond conforming with COM requirements. First, the server object is implemented in a DLL file (i.e., the server application DLL 220 of FIG. 4). (COM objects otherwise alternatively can be implemented in an executable (".exe") file.) Second, the object's DLL file 220 has a standard class factory 222 (i.e., the DLL implements and exports the DllGetClassObject function, and supports the IClassFactory interface). Third, the server object exports only interfaces that can be standard marshaled, meaning the object's interfaces are either described by a type library or have a proxy-stub DLL. The proxy-stub DLL provides a proxy 164 in a client process 166 on the client computer 88, and a stub 74 in the ASP 124 on the server computer 78. The proxy 164 and stub 74 marshal calls from a client program 84 across to the server computer 78. These additional requirements conform to well known practices.

The client program 84 is a program that accesses the functionality of server object 76. The client program 84 can be program code (e.g., an application program, COM Object, etc.) that runs outside of an ASP. Such client programs are referred to as "base clients." Alternatively, the client program 84 can be another server object that also runs in the same or a separate ASP. The client program 84 can reside on the server computer 78 or on a separate client computer 88 as shown in FIG. 3.

Overview of COM Object Instantiation in OLE

As with other COM objects, the client program 84 (FIG. 3) must first request creation of an instance of the server object 76 and obtain a reference to the server object 76 before the client program 84 can access the functionality implemented by the server object 76 (i.e., before the client program can call member functions supported on an interface of the server object).

In Microsoft's OLE, a client program instantiates a COM object using services provided by OLE and a set of standard object interfaces defined by COM based on class and interface identifiers assigned to the object's class and interfaces. More specifically, the services are available to client programs as application programming interface (API) functions provided in the COM+ library, which is part of a component of the Microsoft Windows operating system in a file named "OLE32.DLL." Also, in OLE, classes of COM objects are uniquely associated with class identifiers ("CLSIDs"), and registered by their CLSID in a system configuration database referred to as the "registry." The registry entry for a COM object class associates the CLSID of the class with information identifying an executable file that provides the class (e.g., a DLL file having a class factory to produce an instance of the class). Class identifiers are 128-bit globally unique identifiers ("GUIDs") that the programmer creates with an OLE service named "CoCreateGUID" (or any of several other APIs and utilities that are used to create universally unique identifiers) and assigns to the respective classes. The interfaces of an object additionally are associated with interface identifiers ("IIDs").

In particular, the COM+ library provides an API function, "CoCreateInstance," that the client program can call to request creation of an object using its assigned CLSID and an IID of a desired interface. In response, the CoCreateInstance API looks up the registry entry of the requested CLSID in the registry to identify the executable file for the class. The CoCreateInstance API function then loads the class' executable file, and uses the class factory in the executable file to create an instance of the COM object. Finally, the CoCreateInstance API function returns a pointer of the requested interface to the client program. The CoCreateInstance API function can load the executable file either in the client program's process, or into a server process which can be either local or remote (i.e., on the same computer or a remote computer in a distributed computer network) depending on the attributes registered for the COM object in the system registry.

Once the client program has obtained this first interface pointer of the COM object, the client can obtain pointers of other desired interfaces of the object using the interface identifier associated with the desired interface. COM defines several standard interfaces generally supported by COM objects including the IUnknown interface. This interface includes a member function named "QueryInterface." The QueryInterface function can be called with an interface identifier as an argument, and returns a pointer to the interface associated with that interface identifier. The IUnknown interface of each COM object also includes member functions, AddRef and Release, for maintaining a count of client programs holding a reference (e.g., an interface pointer) to the COM object. By convention, the IUnknown interface's member functions are included as part of each interface on a COM object. Thus, any interface pointer that the client obtains to an interface of the COM object can be used to call the QueryInterface function.

Remote Procedure Call Facility

To achieve distributed computing across network connections, the illustrated computers implement a remoting facility. The Microsoft Distributed Component Object Model (DCOM) provides a remote procedure call (RPC) remoting facility (hereafter "DCOM RPC remoting facility") that allows transparent interface function calls across process and machine (i.e., computer) boundaries. (See, e.g., Brockschmidt, *Inside OLE, Second Edition* 277–338 (1995).)

For transparency, the DCOM RPC remoting facility provides marshaling code (referred to as a "proxy") inside the process of a client program, component or object (the "client") that is making an interface call to an out-of-process or remote-computer-resident object (the "server object"), and also provides unmarshaling code (referred to as a "stub") in the process of the server object. The proxy receives the client's in-process interface call and marshals all data needed for the call (e.g., arguments and in-memory data) into a buffer for transfer to the stub over a communications channel (the "RPC channel") between the client and server processes or machines. The stub unmarshals the data from the buffer at the server object's process and machine and directly invokes the interface call on the server object. The stub also marshals any return value and "out" parameters returned from the interface call for transfer to and unmarshaling by the proxy for passing on to the client.

This remote procedure calling is transparent to the client and server object in that the DCOM RPC remoting facility automatically provides the proxy, the stub and the RPC channel for marshaling the interface call across process and machine boundaries, such that the client and server object can perform the interface call as if both are on the same computer and in the same process. In the illustrated embodiments, the DCOM RPC remoting facility and various other object-related services related to distributed computing are provided by a set of COM+ libraries available in the operating system called the service control manager (or SCM).

Creating an Object in the Load Balancing Architecture

With reference now to FIG. 3, a client program 84 requiring access to server object functionality runs in a client process 166 on a client computer 88. To request a local object, the client program 84 calls the CoCreateInstance API function described above. If an object is to be created remotely, information in the registry is ordinarily set to indicate that object instantiation requests for objects of a particular class are to be sent to an appropriate server. In the case of a load balanced object, the registry indicates requests are to be sent to the router computer 70, and a call to the CoCreateInstance API results in the steps shown in FIG. 5.

In addition to the standard COM functions described above, the COM+ component of the operating system in the illustrated exemplary embodiment provides services relating to contexts, policies and activators, which are further described in the U.S. Patent application of Thatte et al. entitled "Environment Extensibility and Automatic Services for Component Applications Using Contexts, Policies and Activators," filed Aug. 17, 1998, which is hereby incorporated herein by reference. Specifically, the load balancing architecture of FIG. 3 employs activators to implement object creation requests. An activator participates in administrative tasks related to the object creation process and in the exemplary illustrated embodiment is a software object implementing the IActivator interface. Activators are automatically invoked by the COM+ infrastructure upon an API call to CoCreateInstance. An activator's tasks can include determining the computer on which an object should be created and providing references to other objects assembled or created at object creation time. Conceptually, an activator creates a wrapper around an object with a stub as explained in more detail below. When an activator receives an object creation request, the activator expresses the request as activation properties indicating the class identifier of the object, an identifier indicating on what machine the object should be created and other related information.

Activators typically work together in a chain by successively manipulating the activation properties and passing the properties to a next activator in the chain. In the exemplary illustrated embodiment, the process of activation (sometimes called an activation delegation chain) goes through various stages in a particular order. When an activator is finished with its particular tasks, it delegates activation to the next stage. The COM+ infrastructure controls which activator is invoked when an activator delegates onward. As each activator is called, it may create or locate other objects and provide object references. Typically, the last activator in a chain (sometimes called a "base" activator) calls a class factory to create a new instance of the requested object, but base activators may take other actions, such as recycling an object as explained more fully below. Activators can run in various environments, such as in a service control manager, in a client process, or in an ASP. On each computer, the registry is set to associate each object CLSID with appropriate activators for each stage; a default activator is used if an activator for a particular stage is not specified. A chain of activators can include activators running in plural processes on a given computer, and the chain can span plural computers.

An activator can direct activation to a different computer by setting the server property of the activation properties to the desired computer and delegating to the next stage. When the activation chain crosses a machine boundary, the typical activation delegation chain includes a client-side SCM stage to run an activator in the client's SCM and a subsequent server-side SCM stage to run an activator in the server's SCM; however, some agent other than the SCM could host the load balancing activator. In the illustrated embodiment, the router computer 70 directs an object creation request to an appropriate server by appropriately setting the activation properties in the SCM stage.

FIG. 5 illustrates a method for creating a server object in the load balancing architecture shown in FIG. 3. At step 302, the client program's creation request is received by the client activator 160 (FIG. 3). In the illustrated example, the requested object is a load balanced object, and the activation properties derived from the registry indicate the creation request is to be directed to the router computer 70. At step 304 (FIG. 5), the client activator 160 sends the client program's object creation request to the router computer 70 using the DCOM RPC remoting facility. To facilitate transmission of the request, the activator 160 uses services of the client computer's service control manager (not shown), which may involve other activators.

At the router computer 70, a global routing table 66 associates class identifiers with server identifiers in a table structure. In the illustrated embodiment, a hash table is used to associate a class identifier with a server identifier, but some other data structure could alternatively be used. Multiple class identifiers may be associated with the same server. Typically, a class identifier is associated with a single server computer; however, an alternative global routing table 66 could associate a class identifier to multiple servers. In addition to the typical COM attributes, the CLSIDs of objects to be load balanced among the server computers are registered in the system registry (or alternatively in a configuration database called the "catalog") with a "load balance" attribute indicating that the object is to be load balanced. Additional information indicates a target group for the CLSID, as is more fully explained below.

At step 306 (FIG. 5), when the router activator 68 receives the object creation request, the router activator 68 determines if the object is to be load balanced and consults the global routing table 66 to determine the appropriate server computer 78 to host the creation request according to the class identifier in the activation properties. If multiple servers are associated with the class identifier, a random or round robin algorithm can be used to select a server. In this way, requests to create objects of a particular class are routed to a particular server or set of servers. Preferably, the router activator 68 responds quickly. As will be explained more fully below, quick response is achieved in the illustrated embodiment because load balancing engines, not the activator 68, generally carry the burden of periodically updating the global routing table 66. The router activator 68 need only consult the global routing table 66, which provides accelerated look up by associating a hash function on the class identifier with the appropriate server. In this way, a server can be determined quickly from a class identifier. The router activator 68 sets the server identifier property of the activation properties to the selected server identifier, which causes the creation request to be forwarded by the COM+ infrastructure to the server activator 134 at the server identified by the server identifier. Forwarding the request is also sometimes called "delegating" the request to a server. In the illustrated example, the router activator 68 runs in the router's service control manager (SCM) 106, which provides additional services related to the DCOM RPC remoting facility.

In an alternative embodiment, instead of consulting the global routing table 66, the router activator 68 consults some other host server selection means to determine to which server the creation request should be delegated. For example, the router activator 68 can be configured to consult a load balancing engine 62 method comprising code to select an appropriate host server (e.g., a server having a superior performance metric or a server known to be hosting like objects) based on a specified characteristic of the object creation request (e.g., class identifier, client computer identity, client process identity or database requirements). The load balancing engine supplies the selected host server to the activator 68, which delegates the creation request to the selected host server.

The router activator 68 can also be configured to maintain a list of past object creation requests, including the requesting process, the requesting client computer, and the requested class identifier. In this way, the router activator 68 can be configured to route subsequent requests by a process to the same server computer used for the process' past requests. As a result, the client process 166 avoids creating objects on plural server computers, which requires additional connections and may result in degraded performance. Also, the router activator 68 can be configured to route requests by a client computer for objects of the same class identifier to the server used for the client's past requests to provide client affinity.

The server computer 78 also includes an SCM (not shown) which fields and forwards the request to the server activator 134; the SCM may itself contain other activators. At step 308 (FIG. 5), the server activator 134 receives the object creation request. The server activator 134 creates the server object 76 and performs administrative tasks related to the object creation request, including arranging for creation of an object context object 128, an object policy set 140 and a stub 74. The server object 76 and associated elements 74, 128, and 140 are sometimes called an "object cluster;" each of the elements of the object cluster can be implemented as an object (e.g., the stub 74 can be implemented as an object). In effect, the server activator 134 creates a wrapper around the server object 76; subsequent calls to the server object 76 are first routed to the stub 74, which can consult the object context object 128 and object policy set 140. The wrapper, however, is transparent to the client program 84 and the server object 76 in that neither needs to incorporate logic for creating or maintaining the wrapper.

At step 310 (FIG. 5), the server activator 82 creates an object cluster comprising the server object 76, a stub 74 and an object context object 128 with associated object context properties. An appropriate class factory (in a server application DLL, as explained above) creates the server object 76 in an ASP 124 which runs in an execution environment of the selected server computer 78. The stub 74 is responsible for unmarshalling calls to the server object 76 and additionally maintains a reference to the object context object 128 associated with the server object 76. The object context object 128 provides context for the execution of the server object 76 in the execution environment 120. The object context object 128 has a lifetime that is coextensive with that of the server object 76. The server activator 134 creates the object context object 128 when the server object 76 is initially created, and the object context object 128 is destroyed after the server object 76 is destroyed (i.e., after the last reference to the server object is released).

The object context object 128 maintains object context property objects of the server object 76; the object context property objects are determined by the server activator 134 (and possibly other activators) when the server object 76 is created and define the server object's context. Generally, if two objects share the same set of object context property objects, they are said to be in the same context. When a reference to the object 76 is unmarshaled, the object context property objects are consulted to provide certain functions 140 to be run automatically when actions are performed on the server object 76. These certain functions are called object policies 142–144; in the illustrated embodiment, the functions are IPolicy interfaces on objects, which may be the context property objects themselves.

The set of object policies for a particular object is called the object's policy set 140. Thus, the activator can arrange for certain policies to be included in an object's policy set by including a context property object providing the appropriate policy. A context property object providing policies is sometimes called a policy maker because it contributes policies to the policy set; in the illustrated embodiment, a context property object implementing the IPolicyMaker interface is a policy maker. In the illustrated exemplary embodiment, the context property object, policy maker and policy may be implemented as a single object with appropriate interfaces for each of its functions. Alternatively, separate objects could be used. Thus, in the illustrated embodiment, an object's context is defined as an object environment provided by the policy set associated with the object. Context could alternatively be provided by some other mechanism (e.g., code in the RPC or stub layer).

Particular policies 142–144 are invoked according to the action performed on the server object 76. For example, policies called call and return policies typically run on the proxy (e.g., client) side before method calls are passed to the object and before the method returns, respectively. Policies called enter and leave policies typically run on the stub (e.g., server) side immediately before a call and immediately before a return, respectively. As a result, the following is typical of object policy execution order for a method call to an object with a policy set:

1. Issue method call from client program to proxy
2. Execute call policies
3. Direct call to stub
4. Execute enter policies
5. Execute object method, return results to stub
6. Execute leave policies
7. Return method results to proxy
8. Execute return policies
9. Return method results to client program Additionally, an object policy may communicate with other object policies using a buffer mechanism. In the illustrated embodiment, object policies are implemented as software objects having an IPolicy interface, which is defined as follows:

```
Interface IPolicy: IUnknown {
    Call(pcall), Enter(pcall), Leave(pcall),
        Return (pcall);
    CallGetSize(pcall, pcb),
    CallFillBuffer(pcall,pcb,pvBuf),
    EnterWithBuffer(pcall,cb,pvBuf);
    LeaveGetSize(pcall,pcb),
        LeaveFillBuffer(pcall,pcb,pvBuf),
        ReturnWithBuffer(pcall,cb,pvBuf);
    ReleasePolicy(pcall);
    Signal(ceType,pcall);
};
```

Alternatively, additional methods can be implemented in the interface, such as a method called when the object is created and a method called when the object is disposed of or released.

In the case of a load balanced object in the illustrated embodiment, at least one of the context property objects added by the activator 134 is a policy maker contributing a load balancing policy to the object context object associated with the load balanced object. Typical load balancing policies include a metric tracker creator 142 and processing (or performance) metric measurers 143–144. In the illustrated example, the load balance object policies 142–144 facilitate measuring response time of method calls to the server object 76. However, as explained below, alternative metrics can be used, and the various illustrated functions can be implemented using fewer policies.

The object policy 142 creates an instance of a metric tracker object 126 for tracking response time if none already exists within the ASP 124. A default metric tracker 126 tracks response time; however, other metric trackers may be incorporated into the architecture for tracking other processing metrics. The type of metric tracker 126 is determined with reference to the class identifier of the server object 76. The determination can be made either at the server computer 78 or at the router computer 70, to facilitate central control. If control is exercised at the router computer 70, the router activator 68 sets an appropriate activation property during object instantiation time to indicate the desired metric tracker. A reference to the metric tracker 126 is provided to enter policy 143 and leave policy 144. The enter policy 143 runs before method calls and the leave policy 144 runs after method calls to the server object 76 to track response time using the metric tracker 126 as more fully explained below.

The object context object 128 may also contain transaction related information for the server object 76, such as a client id, an activity id, and a transaction reference. The client id refers to the client program 84 that initiated creation of the server object 76. The activity id refers to an activity that includes the server object 76. An activity is a set of objects executing on behalf of a base client, within which only a single logical thread of execution is allowed. The transaction reference indicates a transaction property object (not shown) that represents a transaction in which the server object 76 participates. The object context object 128 is implemented as a COM object that runs under control of the stub 74.

In the illustrated execution environment, the stub 74 maintains an implicit association of the object context object 128 to the server object 76. In other words, the stub 74 does not pass a reference of the object context object 128 to the client program 84 using the server object 76. Rather, the stub 74 maintains the object's association with the context object 128, and accesses the object context object 128 when needed during the client program's access to the server object 76. Thus, the client program 84 is freed from explicitly referencing the object context object 128 while creating and using the server object 76. Finally, an object cluster may be created using just-in-time activation without actually creating a server object 76 as described more fully below.

At step 312 (FIG. 5), the server activator 134 provides a reference to the stub 74 back to the client activator 160, which creates a proxy 164. In the exemplary illustrated embodiment, the call returns first to the router activator 68, then back to the client activator 160. At step 314 (FIG. 5), the stub reference is provided to the proxy 164, and a reference to the proxy 164 is provided to the client program 84, completing the connection from the client program 84 to the server object 76. The client program 84 can thus access the functionality of the server object 76 through the proxy 164 and the stub 74, without need for involvement of the router computer 70. Typically, the reference provided to the proxy 164 is a pointer to an interface of the server object 76, through which the client program 84 can request additional interfaces and access the functionality of the server object 76.

Invoking an Object Method

Still with reference to FIG. 3, when the client program 84 requires access to the functionality of the server object 76, the client program 84 invokes (or calls) a method of the server object 76, resulting in the steps illustrated in FIG. 6.

FIG. 6 shows a method for tracking a processing metric transparently to the client program 84 (FIG. 3) and the server object 76. At step 402 (FIG. 6), the client program 84 sends a method call to the proxy 164, which marshals the call for transmission to the server stub 74 via the DCOM RPC remoting facility using the interface reference provided as explained above. At step 404, the sever stub 74 receives the call.

Upon receiving the method call, the server stub 74 unmarshals the call and consults the object context object 128 to identify which object policies 140 are to be executed before the method call (the enter policies). The load balanced object cluster includes an enter policy 143 that works in conjunction with the metric tracker 126 to record a value indicative of the time of the call, using a real time clock or number of processor ticks. The enter load balance policy is executed at step 406. After any other appropriate object policies are executed, at step 408, the stub 74 passes the method call to the server object, which executes the designated method using accompanying parameters, if any.

When the method call returns to the stub 74, the stub 74 again consults the object context object 128 to identify object policies to be run before the stub 74 returns the method call to the proxy 164 (the leave policies). The load balanced object cluster includes a leave policy 144 that works in conjunction with the metric tracker 126 to determine and record the response time of the method call using the time value recorded by the enter policy 143 as described above. The leave load balance policy 144 executes at step 410 and determines response time by subtracting the recorded time value before the call from the time value before the return (after the call). At step 412, the results of the method call are returned to the client program 84 using the DCOM RPC remoting facility. The metric tracker 126 eventually passes the information about the response time to the metric data store 72 at step 414. In this way, a processing metric is observed and recorded transparently to the server object 76 and the client program 84.

The execution environment of the server accommodates multiple ASPs 124, and each ASP 124 may include plural server objects 76, which may be of various object classes. A metric tracker 126 runs in each ASP 124 having load balanced objects, and each object class may be associated with a separate metric tracker or share a metric tracker. Thus, multiple metric trackers 126 can run in the server's execution environment; the metric trackers share the metric data store 72.

Over the course of time as various method calls are made, observations of response time by the metric tracker 126 are accumulated in the metric data store 72. Single observations (sometimes called "fine grained" data) can be blended into a single collective value. For example, in the exemplary illustrated embodiment, response times are averaged to determine a mean response time. Alternatively, a weighted mean or some other blending function could be used. The average response time is stored for later retrieval by the router computer 70 as described more fully below. When the average response time is retrieved, older observations are aged out of the metric data store. As a result, the average indicates server performance during a relatively recent time period, but variances in response time are dampened.

Since the metric tracker 126 was put in place without explicit instruction from the client program 84 or the server object 76, the metric data store 72 accumulates information about response time even though the client program 84 accesses the server object 76 without regard to whether the object 76 is load balanced. In addition, the server object 76 is freed from incorporating processing metric measurement logic. In this way, application software developers can more clearly focus on the business logic required for proper functionality of software applications incorporating server objects without considering process metric measurement logic.

Sharing Policies

In the above exemplary embodiments, a policy is used by a single object. However, objects can share policies. For example, an activator can be configured to place a second object in the same context as an existing object under certain circumstances (e.g., if two load balanced objects are of the same class). In other words, the two objects share the same object context property objects and associated policies, such as load balancing policies. In this way, a method call to either object results in automatic invocation of the appropriate shared policies to facilitate load balancing.

Load Balancing Service

Turning now to FIG. 7, a load balancing service 502 on a router computer 70 provides load balancing services for client and server computers running in a networked environment. The service 502 includes one or more load balancing engines 62 and 64; the architecture supports a separate load balancing engine per load balanced object class. The load balancing engines 62 and 64 analyze processor metric data to update the global routing table 66. As described above, the global routing table 66 associates class identifiers with server computer identifiers, enabling the router activator 68 to determine which server computer should host an object creation request.

A catalog object 530 provides access to a central store of configuration information (not shown) regarding the server computers serviced by the router computer 70. The configuration information provided by the catalog object 530 includes values for the servers' network addresses, the servers' names (e.g., an identifier), server group names, and which servers are in what groups. The catalog object 530 additionally provides access to a list of applications designated as load balanced, a list of classes in each application, and a load balancing engine associated with each class, if any. A user interface is provided for editing the configuration information so that a system administrator can easily regroup the servers, add a server to the group, designate a load balancing engine for an object class, or perform other administrative tasks. The user interface is described in more detail below.

When the load balancing service 502 is initialized, a supervisor thread queries the catalog object 530 to determine the server groups serviced by the router computer 70. The supervisor thread creates server group objects 520 and server status objects 524 accordingly. The server status objects 524 store information relating to various server attributes, such as server name, server status (e.g., "not responding") and server network address. The server group objects 520 contain information about a particular set of servers serviced by the router computer 70. The group of servers is also sometimes called a target group. The load balancing service 502 can accommodate more than one target group simultaneously and keeps a server status object 524 for each server in a target group. Additionally, the router computer 70 can itself be a server computer in a target group.

During initialization, the supervisor thread creates instances of load balancing engines 62 and 64 as indicated by the catalog object 530 and builds a global routing table 66 of applications, classes, references to target groups (e.g., server group 520) and references to load balancing engines 62 and 64. Object class identifiers (CLSIDs) are associated in the global routing table 66 with a server computer identifier (or name), which identifies a particular server computer. Load balancing engines are passed a reference to the target groups for which they are responsible.

The load balancing engines 62 and 64 in the load balancing service 502 process and analyze the collective metric data store 504 to decide which server computers in a target group should host future object creation requests. The load balancing engines 62 and 64 then manipulate the global routing table 66 accordingly using a reporter object 522. Accordingly, a reference to the reporter object 522 is provided to the load balancing engines 62 and 64 upon initialization.

The router activator 68 runs in a service control manager 106 and shares the global routing table 66 with the reporter objects 522. When the router activator 68 receives an object creation request from a client computer 88, it forwards the request to an appropriate server in the global routing table as explained in the above discussion relating to creating an object.

A default load balancing engine 62 analyzes method call response time observations provided by the server computers and designates a server for hosting future object creation requests. Typically, the load balancing engine 62 modifies the global routing table 66 so that object creation requests of a particular object class are sent to a server in the target group reporting the lowest (i.e., fastest) response time for the object class. However, a different load balancing engine 64 could make decisions based on processing metrics other than response time and choose a preferred server computer accordingly. Additionally, the architecture accommodates a different load balancing engine per class of software objects. For example, the default method response time load balancing engine 62 could be designated for one class of objects, while a load balancing engine routing objects to a server having the most number of open database connections might be designated for another class of objects.

In an alternative embodiment of the invention, the load balancing engines 62 and 64 communicate with each other. Such an arrangement is useful, for example, to communicate information about object groups that tend to run in a particular sequence. For example, if it is known that an order submission object typically creates a credit check object, and the credit check object requires an open database connection to a credit bureau, the credit check object load balancing engine could communicate with the order submission object load balancing engine so that order submission objects are created on a machine that has an open database connection.

The metric collectors 506 are also created when the load balance service 502 is initialized. The metric collectors 506 are implemented in the illustrated embodiment as executing in a collection of threads, one thread for each server object (each server computer); however, if a target group is rather large, fewer threads (e.g., one) can be used. The metric collectors 506 have a list of CLSIDs and create metric servers 508 on the server computers. The metric servers 508 in turn create a metric data store 72 on each of the server computers 78 and consolidate statistics about a particular processing metric for a given class on the server 78. The metric collectors 506 periodically poll the server computers' metric servers 508 to retrieve the consolidated metric data from the server computers' metric data stores 72, and the data is collected into the collective metric data store 504. The polling is achieved using a DCOM RPC remoting facility. The collective metric data store 504 is implemented as a shared memory location accessible by the metric collectors 506 and the load balancing engines 62 and 64.

A benefit to the polling arrangement is that between polls, plural observations can be blended to dampen variance in processing metric observations. In this way, the load balancing service 502 avoids making decisions based on spurious fluctuations typical in certain processing metrics. Accordingly, a system administrator can adjust the polling rate to tune overall system performance. Generally, a greater delay between polls results in greater variance dampening.

Alternative Routing Functions

Typically, the load balancing service routes requests based on the class identifier of the object creation request. However, the load balancing service can be configured to route requests based on some other function. For example, object creation requests can be routed based on the requesting client computer's identity, past routing of requests for a client based on the client computer's identity (also called client affinity), execution environment information associated with the requesting process (e.g., whether the process requires a single threading model or a transaction) or context data associated with the requesting client. In addition, the server can contribute to the routing determination by dynamically joining or leaving a target group. In other words, the server group members can change over time. For example, a server computer might instruct the router computer to remove it from a target group because the server computer has lost a database connection.

Implementation of Load Balancing in Alternative Layers

Although the above exemplary embodiments implement load balancing by using policies, the load balancing logic in the policies could be moved into a different layer. For example, the logic could be placed in the RPC layer or in a stub layer. Also, the layer could be intermittent. In other words, a statistical sampling method could be used to intercept and monitor a portion of method calls to collect processing metric data on a random or otherwise periodic basis instead of using a uniform monitoring method.

Just-in-Time Activation and Object Recycling

In the above examples, the server activator 134 (FIG. 3) fulfills an object creation request by arranging for creating a new instance of the server object 76. In some cases, however, the operating system may instead provide a reference without actually creating a new instance of the server object. Some calls (e.g., addref, release, queryinterface) can be handled by the operating system and are processed without instantiating a new instance of the server object. Later, when the reference is required to complete a method call, an actual server object is created (or recycled, as explained below). Thus, the initial reference provided to the client program might not point to a server object. To prevent use of a reference pointing to no object, the operating system monitors the references and creates or recycles objects accordingly. These references are therefore sometimes called "safe" references, and the process of providing an actual object for a safe reference is sometimes called "activation." The term "just-in-time activation" describes delaying providing an actual object until necessary (e.g., when the client program requires a method call accessing the functionality of the object). The delay occurs between instantiation and the first method call.

Between method calls, an object typically retains state until it finishes its task (e.g., it completes or aborts a transaction); however, after the object finishes its task, it is deactivated (i.e., the object's state is destroyed) and sent to an object pool. Objects from the pool can be recycled for later use. In this way, system resources are conserved because recycling an object requires fewer resources than creating a new one.

Rebalancing Objects

Under certain circumstances, such as in the just-in-time activation scenario described above, a client may retain a reference to an object on a server that has since become overburdened. For example, a client may request an object and receive a safe reference to an object on a favorable server. At this point, an object has not actually been created, and the reference points to no object. Subsequently, when the client program tries to use the object, it may be that no objects can be recycled from the object pool, and the server has become severely overloaded. Thus, creating a new object on the overloaded server would result in unacceptable performance. Better performance would be realized if the object were instead created on a different server.

Separately, a client program may retain a reference to an object between transactions to avoid having to reestablish a connection. While such behavior may be appropriate under certain circumstances, performance on the server may degrade to unacceptable levels between the transactions. In such a case, better performance would be realized if the reference were released and an object created on a different server.

To address problems associated with maintaining references to overloaded servers, the architecture provides a rebalance message arrangement. With reference now to FIG. 8, an object cluster on the server computer 78 includes a server object 76, a stub 74, an object context object 128, and an object policy set 140. The object cluster is assembled by an appropriate activator as described above. The client program runs in a client process 166 on the client computer 88 and accesses the server object 76 via a proxy 164.

The object policy set 140 of the server object 76 includes a retry policy 645. In the illustrated example, the server object 76 might not yet exist because the reference may be a safe reference pointing to no object. The server-side retry policy 645 includes a method invoked before (or alternatively, after) method calls to the server object 76 and has access to the metric data store 72 and information from the other object policies 142-144 to determine if server performance is degraded or if certain server resources are overtaxed. On the client computer 88, an appropriate activator has included a retry policy 652 when assembling the object policy set referenced by the proxy 164.

A flowchart for a method of sending rebalance messages is shown in FIG. 9. The rebalance messages are sent in the context of receiving a method call at the server stub 74, which transparently invokes the server-side retry policy 645 (FIG. 8). At step 702 (FIG. 9), the server-side retry policy 645 compares the processing metric value provided by the metric tracker 126 with an unacceptable level. The unacceptable level is a predetermined value adjustable by an operator at each server or controlled centrally at the router computer 70 (FIG. 3). If the level is determined not acceptable at step 704 (e.g., the response time is above a predetermined number of seconds), the server-side retry policy 645 sends a rebalance message to the client-side retry policy 652 at step 706. The client-side retry policy 652 then breaks the proxy's 164 connection to the stub 74 at an appropriate time at step 708. For example, the proxy 164 may have information indicating that the state of the server object 76 is not important (e.g., the object 76 is in its initial post initialization state) or the server object may be stateless. Accordingly, breaking the connection would not negatively impact the client program's use of the server object's functionality. Communication between the server-side retry policy 645 and the client-side retry policy 652 is achieved by passing a buffer using functionality provided by the DCOM RPC remoting facility. Alternatively, the stub 74 could produce a result indicating that the server computer 78 has failed, forcing the client program 84 to request another object.

At step 710, an object creation request is sent to the router computer as was described above, allowing reconnection to a server object on a different server computer. The object creation request can optionally be delayed until the client program 84 attempts to access the functionality of the server object, thus avoiding creating a new object until its functionality is required.

Neither the client program 84 nor the server object 76 needs to include logic to handle the rebalance message because the logic is accomplished by object policies 645 and 652 put in place by activators transparently to the client program 84 and the server object 76. The activators may be configured to assemble retry policies appropriate to the particular network environment, and their configuration may be changed without modification to the client program or the server object. Central management of the unacceptable performance level is achieved by configuring the router computer to set an appropriate activation property to a specified level value. The value is passed to the server activator, which provides it to the retry policy when assembling the server object policy set. An alternative arrangement would be to pass the value to the metric server 508 (FIG. 7), which could place the value in the metric data store 72 for access by the metric tracker 126 (FIG. 8). Still another arrangement would be to store the value in a catalog available at each server computer and configurable by a system administrator from a central location.

Alternative Target Groups

In the above examples, the illustrated target groups are composed of server computers, and the router selects an appropriate server computer to host object creation requests. However, the load balancing architecture is extensible to support other target groups, such as threads, processes, and contexts.

For example, if an object requires any of a particular set of certain threads on which to run, the certain threads are placed in a target group associated with a class identifier. The load balancing service sends the object to a particular thread from the target group based on the object's class identifier.

Processing Metrics

In some of the above examples, a metric tracker observes response time and a load balancing engine analyzes response time to determine on which server objects should be created. Alternatively, various other processing metrics could be used to generate values generally indicative of performance. For example, the metric tracker might observe the number of recyclable objects in the server computer's object pool, whether a server computer has activated objects of a particular class identifier, the number of free database connections available to the server, load on a database at the server, or latency associated with the server's access to a database. In addition, metrics can be combined and weighted, resulting in a custom processing metric. For example, if two servers tie on response time, the tie could go to a server with the most recyclable objects in its pool. Another approach is to track only a particular method call to an object, or give various method calls a different weight. In this way, a method call most impacting perceived performance (e.g., a method for accepting a customer order) could be given more weight when making load balancing decisions.

In an alternative embodiment of the invention, the load balancing architecture is tailored to route objects known to produce a low variance in a processing metric to one group of servers; objects producing high variance are routed to another group. In this way, consistent performance of the overall system can be tuned more effectively. Since the high variance objects are isolated to a particular group, the objects' behavior can be more easily observed and additional steps taken to reduce the variance.

In addition, a processing metric might track the state of the object. For example, if several software objects on a server are performing a particular task (e.g., an order object waiting for a credit check), the load balancing engine may route object creation requests elsewhere. Since the metric tracker and load balancing engine can be tailored to the specific behavior of the object, the two can cooperate to balance the processing load among servers more effectively. Since the load balancing logic is separated from the server objects implementing the business logic of the application, various engines and trackers can generally be prototyped or tested without introducing logic errors (i.e., software bugs) into the application. Finally, the load balancing engines in the illustrated exemplary embodiment are easily replaceable (sometimes called "pluggable"). Replaceability is achieved because the load balancing engines use a common defined interface to access processing metric data and modify the global routing table.

User Interface

With reference now to FIG. 10, the window 800 shows a user interface by which an administrator can set load balancing for an object. The interface presents a list of objects from which the administrator can select. For example, an administrator might select the object BANK.ACCOUNT 808. A second window 810 is then presented, from which the administrator can enable load balancing for the object, choose a load balancing engine and specify a target group. In addition to providing the illustrated per object load balancing, the user interface also provides a way to enable load balancing for an entire application. The catalog is updated accordingly to reflect the administrator's load balancing selections. In addition, the catalog can be preconfigured by an application developer to relieve the administrator of certain configuration duties. Various related settings such as the appropriate load balancing activator, a polling interval and a retry interval are preferably stored in the registry.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A computer-implemented method for providing an architecture accommodating load balanced instantiation of software objects within a server group of a plurality of server computers, the architecture being transparent to the objects, the method comprising the steps:

interposing a wrapper between a first load balanced object instantiated at a host server computer of the server group and a client of the first load balanced object, the wrapper intercepting calls to the first load balanced object to generate a performance measurement at the host server computer transparently to the first load balanced object;

at a router computer, monitoring performance at the server computers in the server group by collecting the performance measurement from the host server computer and at least one other performance measurement from other server computers in the server group to ascertain measured performance at the servers; and when measured performance of the host server is preferred over measured performance of other server computers in the server group, instantiating a second load balanced object on the host server computer as a result of the performance measurement.

2. A computer-readable medium having computer-executable instructions for performing the steps of claim 1.

3. The method of claim 1 wherein the first object is of an object class;

the performance measurement is identified by object class as a measurement of performance for objects having the object class of the first object;

the monitoring step determines performance at server computers in the server group for objects having the object class of the first object; and the instantiating step instantiates the second object at the host server computer based on whether the second object has an object class matching the object class of the first object.

4. The method of claim 1 wherein a plurality of objects of a same specified object class are instantiated on a selected target group associated with the object class, the target group being a subset of the server group of server computers.

5. The method of claim 1 wherein a selected replaceable load balancing engine designated for an object class determines when monitored performance of the host server computer is preferred over monitored performance of other server computers in the server group.

6. The method of claim 1 wherein the monitoring step comprises periodically blending the performance measurement with plural other similar performance measurements from the host server computer to generate a performance value indicative of performance at the host server computer, the blending sufficiently delayed by a time interval to dampen variance in the performance value.

7. The method of claim 6 wherein the time interval is selected by a system administrator.

8. The method of claim 1 wherein the performance measurement is generated transparently to the first object by a server-side policy of the first object, wherein the policy is invoked by the wrapper.

9. The method of claim 8 wherein the server-side policy is shared by a third object at the server computer; and the server-side policy generates an additional performance measurement associated with the third object, wherein the additional performance measurement is collected by the router computer to monitor host server computer performance.

10. The method of claim 8 wherein the performance measurement indicates method response time at the host server computer as generated by the server-side policy of the first object, the policy operative to observe a first time as a result of an enter event sent to the policy before a method call to the object, the policy further operative to observe a second time as a result of a leave event sent to the policy after the method call to the object, the policy further operative to generate the performance measurement by subtracting the first time from the second time.

11. The method of claim 8 wherein the performance measurement indicates database load as observed at the host server computer transparently to the first object by code invoked by the wrapper.

12. The method of claim 8 wherein the performance measurement indicates database access latency as observed at the host server computer transparently to the first object by code invoked by the wrapper.

13. In a computer network, a load balancing service for distributing object related resource requests among a plurality of load bearing targets identified by target identifiers, the load balancing service comprising:

a routing table mapping object class identifiers to target identifiers, at least one of the mapped object class identifiers mapped to a target identifier identifying a target exhibiting a favorable processing metric for processing objects having an object class of the mapped object class identifier; and a system service for receiving an object related resource request comprising a supplied object class identifier matching an object class identifier in the table, the system service operative to route the resource request to the target identified by the target identifier mapped to by the supplied class identifier in the routing table.

14. The service of claim 13 wherein the system service is an operating system service.

15. The service of claim 13 wherein the target identifiers in the routing table identify server computers in the computer network.

16. The service of claim 13 wherein target identifiers in the routing table identify threads at server computers in the computer network.

17. The service of claim 13 wherein the target identifiers in the routing table identify processes at server computers in the computer network.

18. The load balancing service of claim 13 further comprising:

a collective metric data store operative to receive performance values indicative of the targets' performance according to a processing metric; and a load balancing engine operative to dynamically adjust mappings in the routing table to map an object class identifier to a target identifier identifying a target having a more favorable performance value in the collective metric data store according to the processing metric.

19. The load balancing service of claim 18 wherein the collective metric data store comprises a dampened performance value indicative of a plurality of blended received performance values, at least certain of the blended received performance values of sufficient age to dampen variance in the dampened performance value in the collective metric data store; and the load balancing engine consults the dampened performance value to dynamically adjust mappings in the routing table.

20. In a router computer, a load balancing service for distributing an object creation request comprising an object creation request characteristic among a target group comprising a plurality of server computers, the load balancing service comprising:

a host server computer selection means for selecting a host server computer to host the object creation request, the host server computer selection means operative to accept a supplied object creation request characteristic and specify a selected host server computer, the specified host server computer selected by the host server computer selection means from the target group based on the specified object creation request characteristic;

a system service for routing the component creation request to a server computer in the target group, the system service operative to accept the component creation request comprising the object creation request characteristic, supply the object creation request characteristic to the host server computer selection means, accept from the host server computer selection means a specified selected host server computer and route the object creation request thereto.

21. The load balancing service of claim 20 wherein the object creation request characteristic of the object creation request is a class identifier, and the host server computer selection means specifies a server computer having an activated instantiated object of the class identifier.

22. The load balancing service of claim 20 wherein the object creation request characteristic of the object creation request is a client identity identifying a client computer, and the host server computer selection means specifies a server computer to which object creation requests for the client computer have previously been routed based on the previously-routed requests.

23. The load balancing service of claim 20 wherein the object creation request characteristic is selected from the group consisting of a class identifier of the object creation request, a client computer identity of a computer issuing the object creation request, and a process identity of a process issuing the object creation request.

24. The load balancing service of claim 20 wherein the object creation request is generated by a process executing in an execution environment with associated environment data defining the execution environment, and the object creation request characteristic of the object creation request is the execution environment data.

25. The load balancing service of claim 20 wherein the target group is dynamically adjustable to add or remove a specified server computer from the group based on instructions provided by the specified server computer to the router computer.

26. The load balancing service of claim 20 wherein the object creation request characteristic of the object creation request is a class identifier, the load balancing service further comprising:

a global routing table mapping object class identifiers to host server computers in the target group, wherein the host server computer selection means consists of a mapping function on the global routing table.

27. The load balancing service of claim 26 wherein the global routing table is dynamically updated with processing metric data retrieved from the server computers in the target group.

28. The load balancing service of claim 27 wherein the processing metric data is generated by a RPC layer between the router computer and the server computers.

29. In a computer network, an object creation architecture for balancing a load of object creation requests among a plurality of server computers, the architecture comprising:

a routing table comprising a plurality of stored object class identifiers, wherein at least one stored object class identifier is associated with a server computer;

at a router computer, a load balancing service responsive to a supplied object class identifier in an object creation request from a client program on a client computer and operative to select a server associated with the supplied object class identifier in the routing table, the load balancing service further operative to route the object creation request to an object creation service at the selected server computer;

at the selected server computer, an object creation service responsive to the object creation request from the load balancing service and operative to create a server object of an object class associated with the supplied identifier and further operative to assemble a stub with the server object, the stub operative to monitor calls to the server object to observe and store in a metric data store at the selected server computer a performance value, the performance value indicative of performance at the selected server computer according to a processing metric;

at the router computer, a metric collector operative to retrieve the observed performance value from the metric data store and integrate the performance value into a collective metric data store, wherein the collective metric data store comprises metric data from plural server computers; and a load balancing engine at the router computer operative to consult the collective metric data store and associate in the routing table an object class identifier with a server having a performance value determined superior according to the processing metric by the load balancing engine.

30. The architecture of claim 29 wherein the load balancing engine is a first load balancing engine operative to associate a first class identifier with a server, the architecture further comprising:

a second load balancing engine operative to consult the collective metric data store and associate in the routing table a second class identifier with a server having a performance value determined superior according to the processing metric by the second load balancing engine.

31. In a computer network comprising a router computer, a plurality of server computers and a plurality of client computers, an architecture for balancing a load of computer object processing among the server computers, the architecture comprising:

a routing table at the router computer associating object classes with server computers;

a monitor at a server computer, the monitor operative to intercept a reference to an instantiated first software object of a monitored object class to transparently conduct and record a processing metric observation, the monitor further operative to send a processing metric value based on the processing metric observation and indicative of performance at the server computer;

a load balancing service at the router computer, the load balancing service operative to receive a client computer request to create a second object of the monitored object class and route the request to a selected server associated with the monitored object class in the routing table, the load balancing service responsive to the processing metric value sent by the monitor to associate a server having a favorable processing metric value with the monitored object class in the routing table; and an object creation service at the selected server operative to receive the request from the load balancing service and create an object of the monitored object class.

32. The architecture of claim 31 wherein the load balancing service comprises a plurality of load balancing engines, each load balancing engine operative to modify associations in the routing table relating to an object class particular to the load balancing engine.

33. The architecture of claim 31 wherein the monitor comprises a plurality of metric trackers, each metric tracker operative to conduct and record a performance metric observation relating to an object class particular to the metric tracker.

34. In a computer network having a router computer and a plurality of server computers in a target group, a method for balancing object processing among the plurality of server computers, the method comprising:

conducting plural processing performance metric observations associated with a software object class at a server computer;

periodically blending the observations into a representative value indicative of performance at the server computer;

periodically transferring the representative value from the server computer to a router computer to provide plural successive representative values to the router computer, wherein transferring is sufficiently delayed to facilitate blending a number of observations to dampen variance in the successive representative values;

receiving at a router computer the plural representative values from the server computer and plural representative values from at least one other server computer in the target group; and routing resource requests received by the router computer to a server computer in the target group having a representative value indicative of more favorable performance than another server computer in the target group.

35. The method of claim 34 wherein the blending step comprises calculating the average of plural response times observed at the server computer.

36. In a computer network comprising a client computer and a server computer, a computer implemented method for accommodating object transparent rebalance messages from the server computer to the client computer, the method comprising:

generating a proxy at the client computer for receiving and forwarding calls from a client program to a software object;

generating a stub at the server computer for receiving and forwarding calls from the proxy to the software object;

establishing a connection between the proxy and the stub;

providing the proxy with rebalance message receptive code run by the proxy transparently to the server object and the client program;

providing the stub with rebalance message generating code run by the stub transparently to the server object and the client program;

when the stub is referenced, determining in the rebalance message generating code whether performance at the server computer is below an acceptable minimum; and if performance at the server computer is below the acceptable minimum, sending a rebalance message from the rebalance message generating code to the rebalance message receptive code.

37. The method of claim 36 wherein the software object is a first software object, the method further comprising:

upon receiving a rebalance message in the rebalance receptive code, severing the connection between the proxy and the stub and creating a second software object on a computer other than the server computer.

38. A load balancing service for balancing object processing among a plurality of server computers by accommodating object creation requests from a plurality of client programs executing on a plurality of client computers, the load balancing service comprising:

- at a client computer, a configuration database for associating object classes with remote computers, at least one object class in the configuration database associated with a router computer;
- at the client computer, an operating system service operative to receive an object creation request comprising an object class, the operating system service further operative to direct the object creation request to a computer associated with the object class in the configuration database;
- at the router computer, a routing table for associating an object class with a server computer;
- at the router computer, a routing service operative to receive the object creation request from the client computer and route the request to a selected server computer associated with the request's object class in the routing table;
- at the selected server computer, a class instance creator operative to receive the object creation request and create an object of the request's object class;
- an operating system service for providing a wrapper around the object, the wrapper comprising a method invocation service, the method invocation service operative to receive invocations of a method of the object from a client program and forward the invocation to the object, the method invocation service further operative to observe execution of the method by the object to produce an object class method performance observation, the object class method performance observation associated with the object class of the object and indicative of the method's performance according to a processing metric;
- an observation collection service at the router computer operative to collect and store the object class method performance observation and at least one other object class method performance observation in a collective observation store from a target group, the target group comprising the selected server computer and other plural server computers; and
- a load balancing engine at the router computer operative to evaluate the object class method performance observations from the target group to associate a favorable server computer in the target group with a selected object class in the routing table, the evaluated observations associated with the selected object class in the collective observation store, the favorable server computer having a more favorable object class method performance observation than another server in the target group according to the processing metric.

39. A computer-readable medium having stored thereon a data structure for routing object creation requests from a remote client computer, the data structure comprising:

- identifiers indicative of an object class; and
- a server identifier associated in the data structure with a selected one of the identifiers indicative of an object class, the server identifier indicative of a server computer providing to a router computer favorable processor metric observations for processing objects of the object class indicated by the selected one of the identifiers indicative of an object class.

40. The computer-readable medium of claim 39 wherein the processing metric is response time for a method of an object of the object class indicated by the selected identifier indicative of an object class, and the data structure is sharable among a plurality of load balancing engines at the router computer and an activator at the router computer.

41. The computer-readable medium of claim 39 wherein the data structure is an accelerated routing table comprising a lookup table associating a server identifier with a hash function of an identifier indicative of an object class.

* * * * *